(12) United States Patent
Rodrigues et al.

(10) Patent No.: US 9,855,533 B2
(45) Date of Patent: Jan. 2, 2018

(54) NANOCOMPOSITE POLYMER-CARBON BASED NANOMATERIAL FILTERS FOR THE SIMULTANEOUS REMOVAL OF BACTERIA AND HEAVY METALS

(71) Applicant: UNIVERSITY OF HOUSTON SYSTEM, Houston, TX (US)

(72) Inventors: Debora F. Rodrigues, Houston, TX (US); Rigoberto C. Advincula, Friendswood, TX (US); Fritz Claydon, Friendswood, TX (US); Catherine M. Santos, Houston, TX (US); Maria Celeste R. Tria, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 386 days.

(21) Appl. No.: 14/570,861

(22) Filed: Dec. 15, 2014

(65) Prior Publication Data
US 2015/0182920 A1 Jul. 2, 2015

Related U.S. Application Data

(62) Division of application No. 13/609,179, filed on Sep. 10, 2012, now Pat. No. 8,925,736.
(Continued)

(51) Int. Cl.
*B01D 67/00* (2006.01)
*B01D 69/02* (2006.01)
(Continued)

(52) U.S. Cl.
CPC ....... *B01D 69/148* (2013.01); *B01D 67/0079* (2013.01); *B01D 69/02* (2013.01);
(Continued)

(58) Field of Classification Search
CPC .... B01D 67/0079; B01D 69/02; B01D 69/12; B01D 69/147; B01D 69/148;
(Continued)

(56) References Cited

U.S. PATENT DOCUMENTS

2004/0118287 A1 6/2004 Jaffe et al.
2005/0067346 A1 3/2005 Noack et al.
(Continued)

OTHER PUBLICATIONS

Santos et al. "Antimicrobial graphene polymer (PVK-GO) nanocomposite films" Chem. Commun. 2011, 47, 8892-8894 (published Jun. 14, 2011).*
(Continued)

*Primary Examiner* — Lucas Stelling
(74) *Attorney, Agent, or Firm* — Jackson Walker LLP

(57) ABSTRACT

The disclosed subject matter provides a filter that is modified by a polymer-carbon based nanomaterial nanocomposite intended to significantly enhance the performance of filtration, separation, and remediation of a broad variety of chemicals, heavy metal ions, organic matters, and living organisms. Polymeric materials, such as but not limited to poly-N-vinyl carbazole (PVK), are combined with (1) graphene (G) and/or graphene-like materials based nanomaterials and (2) graphene oxide (GO) chemically modified with a chelating agent such as but not limited to EDTA. The nanocomposite is homogenously deposited on the surface of the membrane.

6 Claims, 21 Drawing Sheets

Related U.S. Application Data

(60) Provisional application No. 61/533,342, filed on Sep. 12, 2011.

(51) Int. Cl.
  *B01D 69/12* (2006.01)
  *B01D 69/14* (2006.01)
  *B01D 71/02* (2006.01)
  *B01D 71/28* (2006.01)
  *B01D 71/82* (2006.01)

(52) U.S. Cl.
  CPC ........... *B01D 69/12* (2013.01); *B01D 69/147* (2013.01); *B01D 71/021* (2013.01); *B01D 71/28* (2013.01); *B01D 71/82* (2013.01); *B01D 2323/36* (2013.01); *B01D 2323/46* (2013.01); *B01D 2323/48* (2013.01); *B01D 2325/12* (2013.01); *B01D 2325/48* (2013.01); *Y10S 977/734* (2013.01); *Y10S 977/753* (2013.01); *Y10S 977/847* (2013.01)

(58) Field of Classification Search
  CPC ...... B01D 71/021; B01D 71/28; B01D 71/82; B01D 2323/46; B01D 2323/48; B01D 2325/12; B01D 2325/48; Y10S 977/734; Y10S 977/753; Y10S 977/847
  See application file for complete search history.

(56) References Cited

U.S. PATENT DOCUMENTS

| | | |
|---|---|---|
| 2006/0052509 A1 | 3/2006 | Saitoh |
| 2008/0290020 A1 | 11/2008 | Marand et al. |
| 2008/0302243 A1 | 12/2008 | Byrd et al. |
| 2009/0007555 A1* | 1/2009 | Jensen ................ B01D 69/141 60/326 |

OTHER PUBLICATIONS

Zhang et al. "Poly (N-Vinylcarbazole) Chemically modified Graphene Oxide" Journal of Polymer Science: Part A: Polymer Chemistry, vol. 48, 2642-2649 (2010).*

* cited by examiner

NANOCOMPOSITE POLYMER-CARBON BASED NANOMATERIAL FILTERS FOR THE SIMULTANEOUS REMOVAL OF BACTERIA AND HEAVY METALS

RELATED APPLICATIONS

This application is a divisional application of U.S. Non-Provisional patent application Ser. No. 13/609,179, filed Sep. 10, 2012, and claims priority to both U.S. Non-Provisional patent application Ser. No. 13/609,179, filed Sep. 10, 2012, and U.S. Provisional Patent Application Ser. No. 61/533,342, filed Sep. 12, 2011, both of which are hereby incorporated by reference for all purposes.

GOVERNMENTAL SPONSORSHIP

Not Applicable.

REFERENCE TO A SEQUENTIAL LISTING

Not Applicable.

BACKGROUND OF THE INVENTION

Embodiments of the present invention relate to a method and process for the modification of membrane surfaces to significantly enhance the performance of filtration, separation, and remediation of a broad variety of chemicals, heavy metal ions, organic matters, and living organisms.

Generally speaking, issues related to bacterial infection and to the presence of heavy metals in water and wastewater systems have presented challenges for a long time and are still of a major concern today. The conventional ways to address bacterial issues include the use of chemicals (e.g. chlorinated compounds), UV treatment, heat treatment to treat or remove pathogens, and any combination thereof. In a similar manner, heavy metals are currently removed either using chelating agents (e.g. EDTA) or ion exchange processes that are specific to the metal of interest. Commercially used membrane filters have been applied for different purposes such as separation, cleaning, and protection. However, these filters cannot simultaneously remove heavy metals and inactivate microorganisms, which is a very important limitation to efficient water treatments.

Heavy metals released into the environment from metal plating, mining operations, metal finishing, welding, alloy manufacturing and agricultural activities pose a significant threat to the environment and public health due to their reported toxicity even at trace levels. Heavy metals are not biodegradable and tend to accumulate in living organisms, causing serious diseases and health disorders. Thus, effective removal of hazardous heavy metals from water and wastewater is very important and has become a challenging task for scientists and engineers. There are several available methods to treat or remove heavy metals; these include, but are not limited to, chemical precipitation, membrane filtration, ion exchange, adsorption and electrochemical technologies. Among these methods, adsorption is one of the most promising, and widely used methods due to its simplicity and low cost.

The popularity of heavy metal adsorption methods in wastewater treatment has resulted in the development of new adsorbent materials that can effectively remove heavy metals from solutions. Some of the adsorbents studied for adsorption of metal ions include activated carbon, fly ash, sawdust, crab shell, coconut shell, sugarcane bagasse, zeolite, rice husk, and iron and manganese oxides. However, these adsorbents have poor removal efficiencies for low concentrations of metal ions. The development of novel nanomaterials with increased affinity, adsorption capacity, and selectivity for heavy metals and other contaminants have recently gained more attention. Nanomaterials have become attractive as adsorbent materials because they have much larger surface areas than bulk particles. Moreover, some nanomaterials can be functionalized with various chemical groups to increase their affinity for target compounds. These unique properties of nanomaterials have been recently exploited by several researchers to develop high capacity and selective adsorbents for metal ions and anions.

Graphene-based polymer nanocomposites are one of the most promising and recent technological developments that combine unique features of graphene-based materials and polymer materials in one nanohybrid material. These nanohybrid materials show considerable improvement in properties that cannot normally be achieved using conventional composites or virgin polymers. Among the nanohybrid materials, polyvinyl-N-carbazole-graphene oxide (PVK-GO) nanocomposite is very promising, since it has different ways of polymerization, fabrication, and dispersion. Furthermore, PVK-GO has significant antimicrobial properties. However, no studies have, to date, explored the possibility of using PVK-GO to remove heavy metals.

Membrane separation systems are used for different sources of water with different water quality and have shown impressive promise for water treatment because of their potential to remove microorganisms and organic/inorganic pollutants. However, membrane operation and performance are often limited by a combination of phenomena, including but not limited to biofouling (e.g., bacterial adhesion), heavy metal contamination, and concentration polarization (i.e., solute build-up), particularly at the membrane surface. As such membrane biofouling is inherently complex, it is known to be initiated by the adhesion of one or more bacteria to the membrane surface, followed by the growth and multiplication of the sessile cells, which can eventually form a biofilm. Significant improvements in this art would involve new methods and processes that render membranes multifunctional, where such membranes would capture and separate all kinds of chemicals, including organic matters and living organisms, such as but not limited to bacteria.

Known technology in the field teaches the modification of the surface of commercial membranes using polymeric material incorporated with antibacterial silver agent. The present invention achieves improved results over existing systems by making use of carbon based nanomaterials, such as but not limited to graphene and graphene oxide (GO), which is known to possess significant anti bacterial properties, and by combining it with other agents such as but not limited to ethylenediamine tetraacetic acid (EDTA), which is known to be effective at removing heavy metals in solutions.

The choice of graphene, graphene oxide, or related variations is judicious because these materials not only possess anti-bacterial properties, but also improve membrane strength, thermal stability, and water flux. However, use of these nanomaterials (graphene, GO) as coating material on membranes has been limited due to its poor dispersion in most media and its high cost.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section

BRIEF SUMMARY OF THE INVENTION

The present invention relates to a modified filter treated with a polymer-carbon based nanomaterial nanocomposite. The nanocomposite is comprised of a PVK-graphene based nanocomposite that is utilized for the removal of bacteria and heavy metals. In one embodiment, the polymer is comprised of PVK and the concentration of the polymer ranges from 1 to 10 percent. In one embodiment, the carbon-based material is comprised of a graphene-based nanomaterial and the concentration ranges from 90 to 99 percent. The pH of the nanocomposite ranges from 1 to 12 and is deposited homogeneously on the surface of a filter.

BRIEF DESCRIPTION OF THE DRAWINGS

The invention can be better understood with reference to the following detailed description together with the illustrative drawings.

DETAILED DESCRIPTION OF THE INVENTION

Figure 1:
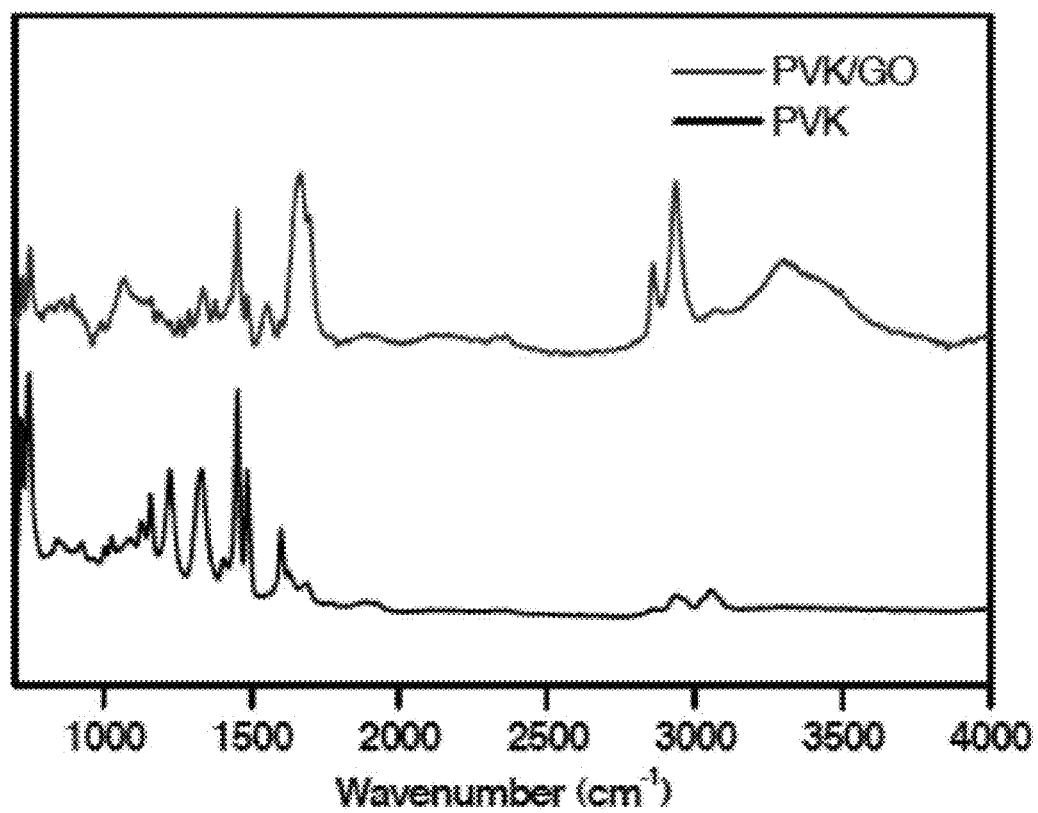
FIG. 1 displays an embodiment of (FTIR) spectroscopy of the PVK and PVK-GO immobilized on ITO surface.

Embodiments of the present invention relate to a method and process for the modification of membrane surfaces believed to significantly enhance the performance of filtration, separation, and remediation of a broad variety of chemicals, heavy metals, ionic species, organic matters, and living organisms. The present invention is believed to offer a new robust method and process to kill pathogens while removing heavy metals simultaneously.

Generally speaking, the present invention discloses methods and processes for the modification of filter membranes with nanocomposites made of a polymer with carbon-nanomaterials. In this process, polymeric materials, such as but not limited to poly-N-vinyl carbazole (PVK), are combined with (1) graphene (G) and/or graphene-like materials based nanomaterials and (2) graphene oxide (GO) chemically modified with a chelating agent such as but not limited to EDTA. The advantage of such chemical combination is that these polymer carbon-based nanocomposites display both antibacterial and chelating properties, which allow for the simultaneous removal of chemicals, heavy metals, organic matters, and living organisms. Polyvinyl-N-carbazole (PVK) may be chosen as base polymer because it contains multiple aromatic groups that facilitate π-π interaction, making it a more compatible polymer for carbon-based nanomaterials like GO. PVK also possesses excellent thermal, mechanical, and biocompatible properties along with ease of preparation. There is evidence that mixtures of PVK-SWNTs (single-walled carbon nanotubes) suspension may significantly reduced the amount of costly single wall nanotubes (SWNT) while showing excellent dispersion of SWNT in PVK. A PVK-SWNT was used for all experimentation, as previous work showed that SWNT is most dispersed and stable in PVK.[16] Similar results were shown with GO and G in the presence of PVK.

Useful industrial applications can be obtained as the disclosed method and process are applicable to a broad variety of commercially available membranes, including but not limited to cellulose nitrate, polyvinylidine fluoride (PVDF), nylon, polycarbonate, cellulose, poly-tetrafluoroethylene (PTFE), ceramic filters, and glass fiber.

The methods and processes disclosed herein are well suited for large scale fabrication and production as scale-up does not impede the performance and function of the filter, but rather adds additional properties (simultaneous removal of bacteria, heavy metal removal or other chemicals) leading to filters that are multifunctional, robust, and inexpensive to fabricate and use.

The characterization of the coated membranes was performed by determining the chemical composition and functional groups present only in the nanocomposites and not found on bare membranes. To obtain the coated membranes, the nanocomposite was homogenously deposited on a surface of a filter membrane and analyzed using XPS and ATR-IR. Pure PVK and GO were also analyzed as reference for the nanocomposite characterization in the same fashion as the nanocomposite. ATR-IR measurements were performed using a Nicolet iS10 Mid Infrared FT-IR Spectrometer (Thermo Fisher Scientific) equipped with ZnSe crystal. Data was acquired using Omnic 8 Software (Thermo Fisher Scientific). All experiments were done in triplicate.

XPS measurements were done using a PHI 5700 X-ray photoelectron spectrometer equipped with a monochromatic Al Kα X-ray source (hv=1486.7 eV) incident at 90° relative to the axis of a hemispherical energy analyzer. The spectrometer was operated both at high and low resolutions with pass energies of 23.5 eV and 187.85 eV, a photoelectron take off angle of 45° from the surface, and an analyzer spot diameter of 1.1 mm. The survey spectra were collected from 0 to 1400 eV, and the high resolution spectrum were obtained for photoelectrons emitted from C1s and O1s. All spectra were collected at room temperature with a base pressure of $1 \times 10^{-8}$ torr. Electron binding energies were calibrated with respect to the C1s line at 284.5 eV (C—C). A PHI Multipak software (version 5.0A) was used for all data processing. The high resolution data were analyzed first by background subtraction using the Shirley routine and a subsequent non-linear fitting to mixed Gaussian-Lorentzian functions.

A preferred embodiment of the present invention discloses a method and process for the fabrication of PVK-GO/PVK-GO-EDTA/PVK-G nanocomposite and GO-EDTA nanomaterial modified membrane filters for antibacterial and heavy metal removal. In one embodiment, the modified filters may be prepared by gravity coating or dip-coating method and may have an average thickness of about 4.6 μm. The modified-membranes have an average constant permeation rate of about 57 L m$^{-2}$ h$^{-1}$ when measured using a peristaltic pump. In some embodiments described herein, 47 mm nitrocellulose and polyvinylidine fluoride membranes (Millipore, USA) with pore sizes of 0.45 μm and 0.22 μm have been tested, but other membranes may also be suitable.

Commercial materials used in the preparation of the embodied membranes can be purchased from a variety of retailers. For the preparation of embodiments described herein, the poly-N-vinyl carbazole (PVK) and graphite (–10 mesh, 99.9% metal basis) may be obtained from Sigma Aldrich (USA) and Alfa Aesar, respectively. $H_2SO_4$, $KMnO_4$, and HCl may be obtained from Fisher Scientific. $NaNO_3$ and NaOH may be obtained from Merck KGaA and Across, respectively. $H_2O_2$ may be obtained from MACRON. All chemical reagents may be of analytical grade and used without further purification. All aqueous solutions may be prepared using dionized (DI) water or Millipore water.

In some embodiments, PVK-GO coated filter membranes may be prepared from a well-dispersed PVK-GO solution in water by dip-coating process. This is achieved by dipping filter membranes made of cellulose nitrate, polyvinylidine fluoride (PVDF), nylon, polycarbonate, cellulose, poly-tetrafluoroethylene (PTFE), or a combination thereof or any related material, and glass fiber, or ceramic filters in a beaker containing poly-N-vinyl carbazole-graphene oxide (PVK-GO) (10-90 wt % PVK-GO) solution in 10% CHP [N-Cyclohexyl-2-pyrrolidone] for about 30 minutes. This is followed by subsequent washing with 10% CHP. Prior to use and testing, the modified filters are then dried in vacuum overnight. The stability of the resulting coated filter surfaces is tested using Atomic Force Microscopy (AFM) before and after washing of the films. Results as shown in FIG. 1 demonstrate that AFM images observed after several washings remain the same, indicating that the modified filters are stable. The modified PVK containing filters are observed to have the following properties: (1) remove heavy metals, (2) inactivate and remove pathogens and (3) to be non-cytotoxic to human cells.

The presence of PVK-GO on the coated filters for some embodiments was verified using Fourier Transform Infrared (FTIR) spectroscopy are shown in FIG. 1. The characteristic bands of PVK are: 3100 cm$^{-1}$ (aromatic C—H stretch), 2900-3000 cm$^{-1}$ (aliphatic C—H stretch from the polymer backbone), 1597 cm$^{-1}$ (C=C stretching), 1255 cm$^{-1}$ (C—N stretching of vinyl carbazole), 1100-1150 cm$^{-1}$ (in plane —C—H aromatic), and 749-800 cm$^{-1}$ (out of plane —C—H aromatic). The successful incorporation of GO in the nanocomposite is verified by the appearance of the C=O (1700 cm$^{-1}$) and OH (3200 cm$^{-1}$) stretch peaks coming from the carbonyl and carboxylic acid/hydroxyl groups, respectively of GO.

Figure 2A:
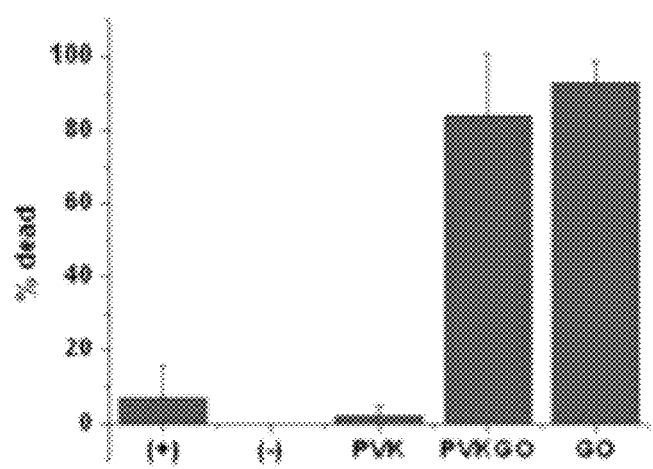
FIG. 2A displays an embodiment of viability assay results of filters exposed to (a) E. coli.
Figure 2B:
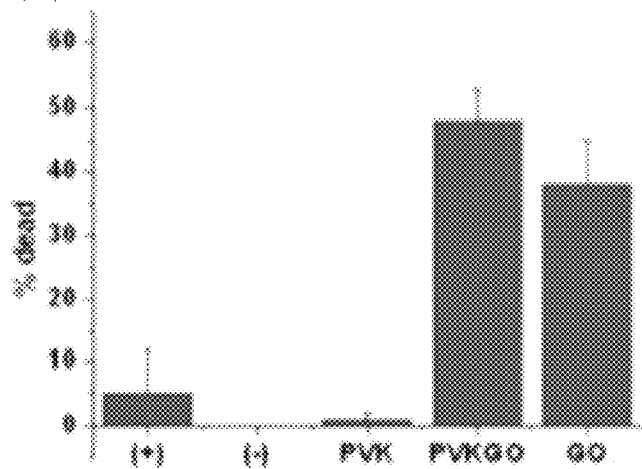
FIG. 2B displays an embodiment of viability assay results of filters exposed to (b) B. subtilis.

Other embodiments of the present inventions disclose the ability of the modified membrane filters [PVK-GO (97:3 wt %)] to remove both Gram-positive and Gram-negative bacteria, as illustrated in FIGS. 2A and 2B with (a) *E. coli* and (b) *B. subtilis*. Bacterial solutions of *Escherichia coli* (*E. coli*) and *Bacillus subtilis* (*B. subtilis*) are separately passed through the modified filters. Control filters modified with PVK, GO, and an unmodified filter are also filtered with the bacterial solutions. Bacterial measurements are divided into two categories: (1) filter test and (2) filtrate test. For the filter test, filters after the filtration experiment are collected and then tested for viability assay, filter agar assay, and microscopy via secondary electron microscopy (SEM). On the other hand, the flow through after the bacterial filtration is collected and then tested using plate count assay and DNA quantification. Viability results of the filters are depicted in FIGS. 2A and 2B. Filters modified with GO (PVK-GO, GO) show a higher bacterial death for both *E. coli* and *B. subtilis*. PVK-GO modified filters show comparable antibacterial property as a GO-modified substrate with only 3 wt % GO loading on the nanocomposite.

Figure 3A:
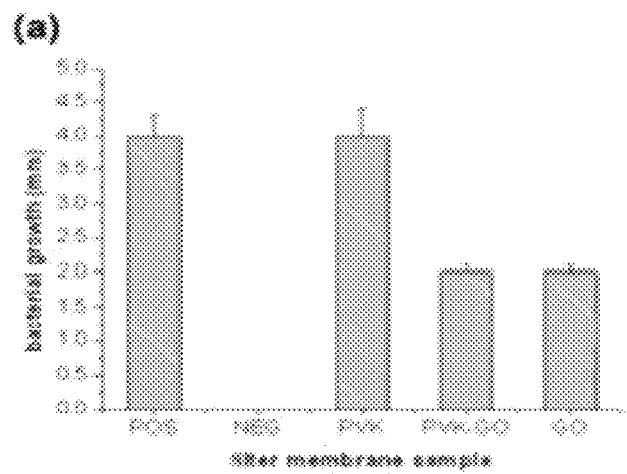
FIG. 3A displays an embodiment of the measurement of bacterial growth for the filter agar test of filters exposed to (a) E. coli.
Figure 3B:
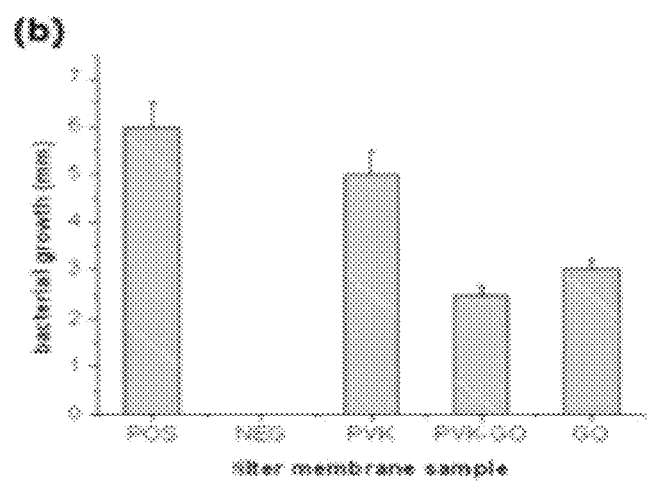
FIG. 3B displays an embodiment of the measurement of bacterial growth for the filter agar test of filters exposed to (b) B. subtilis.
Figure 3C:
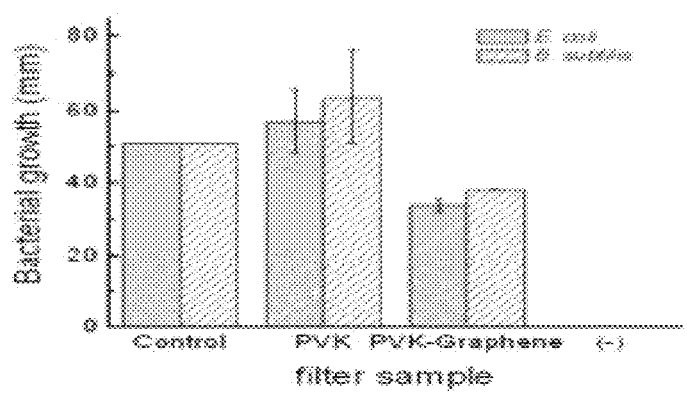
FIG. 3C displays an embodiment of the measurement of bacterial growth for the (c) filter agar test with PVK-G and G for E. coli and B. subtilis.

Other embodiments of the present invention disclose the ability of PVK-GO-modified filters to limit or inhibit the growth of both Gram-positive and Gram-negative bacteria as illustrated in FIGS. 3A, 3B, and 3C with (a) *E. coli* and (b) *B. subtilis*, and (c) filter agar test with PVK-G and G for *E. coli* and *B. subtilis*. Filter agar assay are obtained for the filters after filtration. The filters with bacteria are flipped onto TSA plates and incubated at 37° C. overnight. Results are acquired by measuring the area of bacterial growth around the filter after incubation. Results show that PVK-GO-modified filters successfully limit the growth of bacteria relative to the unmodified filter and PVK-filter (FIGS. 3A and 3B) and PVK-G modified filter (FIG. 3C).

Figure 4A:
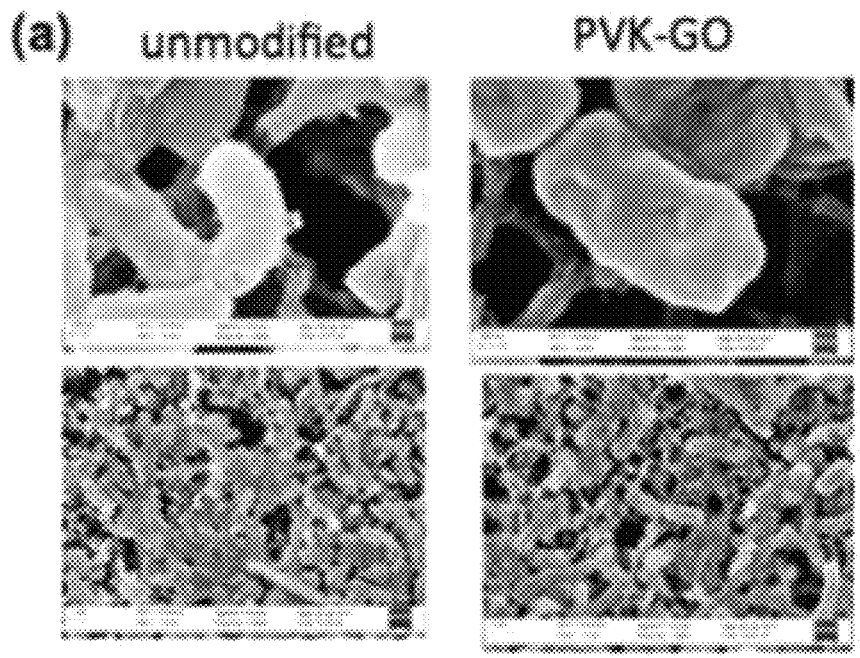
FIG. 4A displays an embodiment of SEM images of filters exposed to (a) E. coli.
Figure 4B:
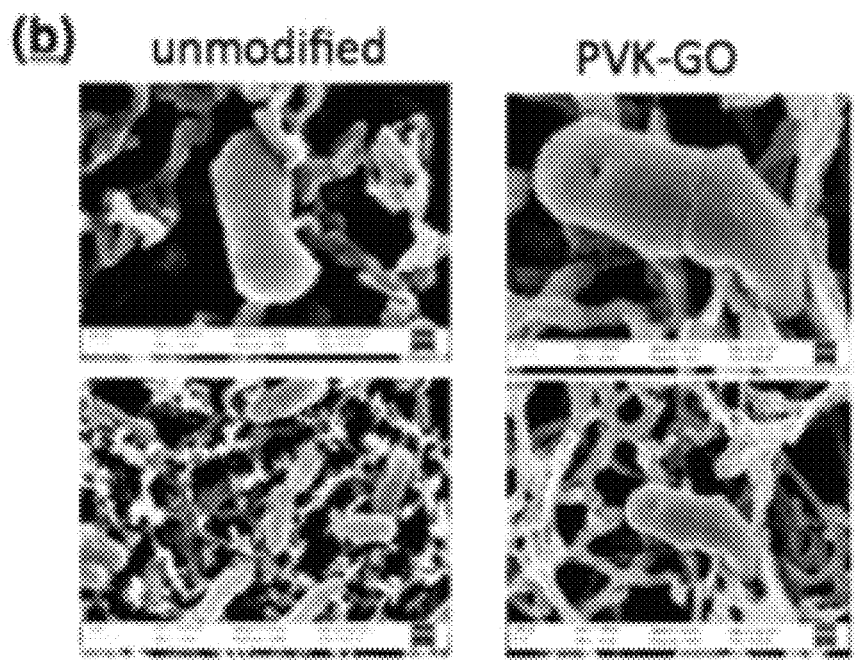
FIG. 4B displays an embodiment of SEM images of filters exposed to (b) B. subtilis.

Other embodiments of the present invention disclose the ability of PVK-GO-modified filters to kill bacteria via lysis. Modified filters after filtration with bacterial solution are imaged using secondary electron microscopy (SEM). Results as depicted in FIGS. 4A and 4B showing that flatter and more shrank images of the bacteria are observed for those exposed on the filter presenting surfaces that contain graphene oxide. This result is more prominent on filters incubated with *E. coli* rather than with *B. subtilis* as Gram-negative cell walls are generally thinner than Gram-positive cell walls and therefore more prone to lysis.

Figure 5A:
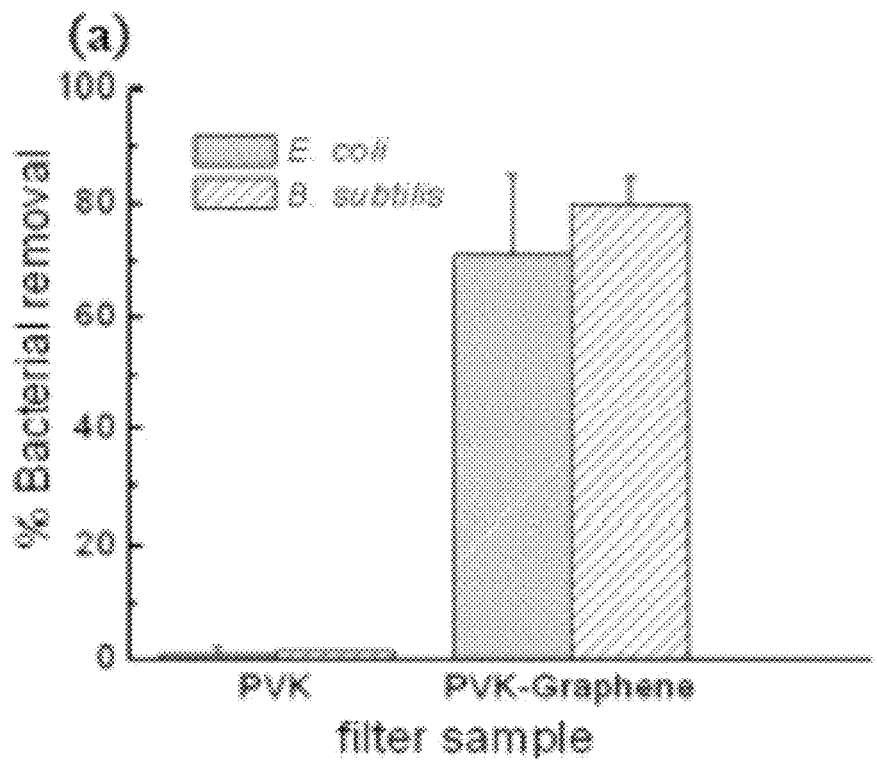
FIG. 5A displays an embodiment of the correlation of the log bacterial removal after plate count assay for modified filters exposed to (a) PVK-G.

Other embodiments of the present invention disclose the ability of PVK-GO-modified filters and GO modified filters to effectively remove Gram-positive and Gram-negative bacteria. Bacterial measurements are performed on the flow through (filtrate) containing bacteria. Plate count assay measurements are conducted to estimate the removal efficacy of the PVK-GO modified filters. Plate count results (FIGS. 5A and 5B) depicted an estimated log 4 removal of *B. subtilis* and *E. coli* for both PVK-GO and GO modified membranes.

Figure 5B:
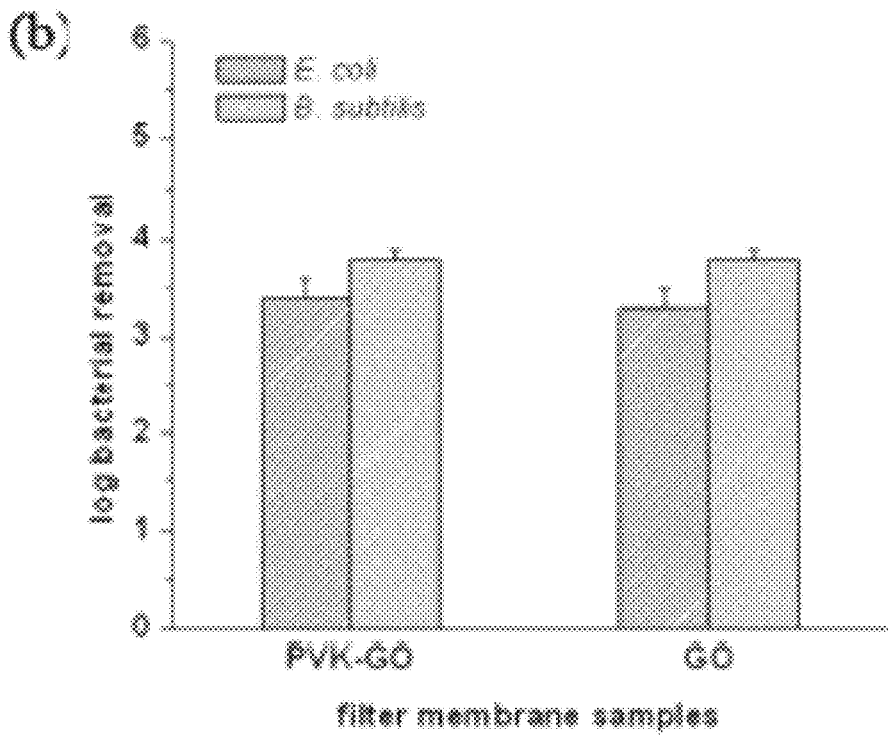
FIG. 5B displays an embodiment of the correlation of the log bacterial removal after plate count assay for modified filters exposed to (b) PVK-GO and GO.
Figure 6A:
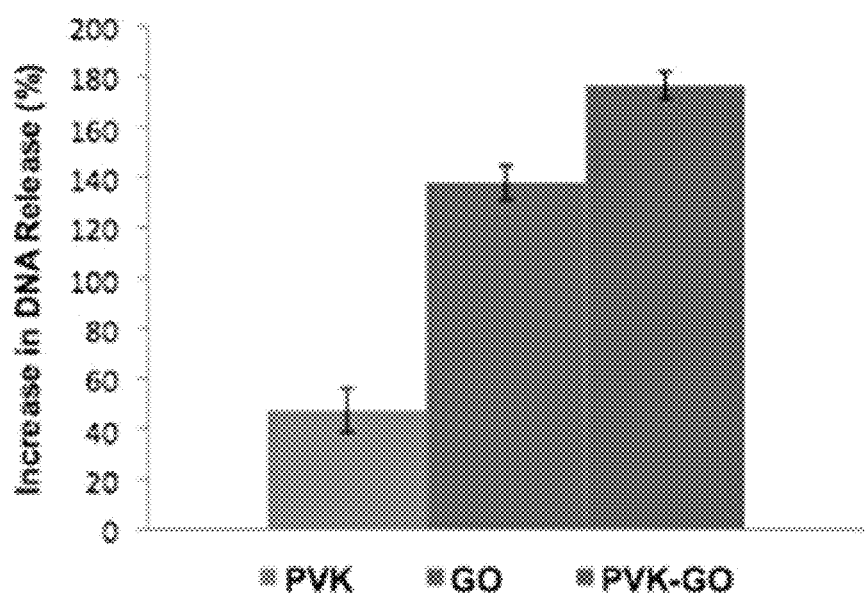
FIG. 6A displays an embodiment of the plot of the increase in bacterial DNA released after filtration of the bacterial solution on the modified filter (a) E. coli.
Figure 6B:
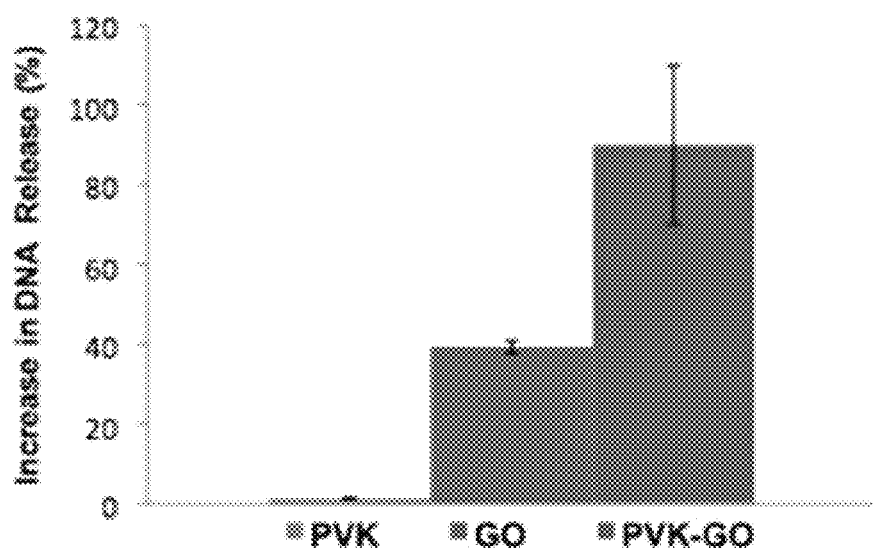
FIG. 6B displays an embodiment of the plot of the increase in bacterial DNA released after filtration of the bacterial solution on the modified filter (b) B. subtilis.

Other embodiments of the present invention disclose the ability of PVK-GO-modified filters and GO modified filters to effectively lyse bacteria as measured by the increase of DNA release and the resulting correlation of the log bacterial removal after plate count assay for modified filters exposed to (a) PVK-G and (b) PVK-GO and GO. To verify the bacterial removal results observed after filtration of the bacteria on the modified filters, quantification of the DNA of the bacteria released on the flow through are obtained (FIGS. 6A and 6B). As expected, higher increase in bacterial DNA release is observed for PVK-GO and GO filters. These results corroborate well with the bacterial toxicity results observed for the GO-modified filters (PVK-GO, GO) after plate count assay, as illustrated in FIG. 5B.

Figure 7A:
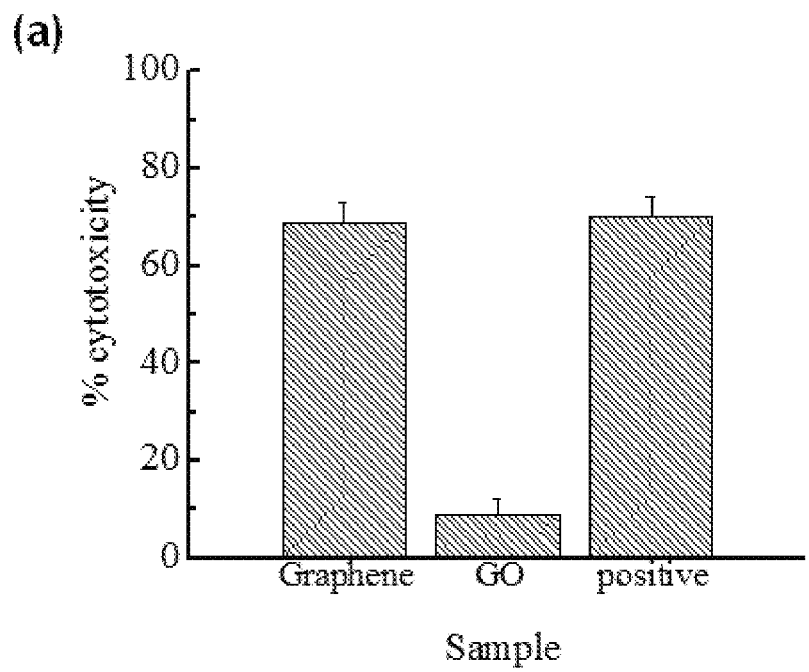
FIG. 7A displays an embodiment of a cytotoxicity measurement of the nanomaterial against NIH-3T3 fibroblasts, wherein the nanomaterial is (a) pure nanomaterial.
Figure 7B:
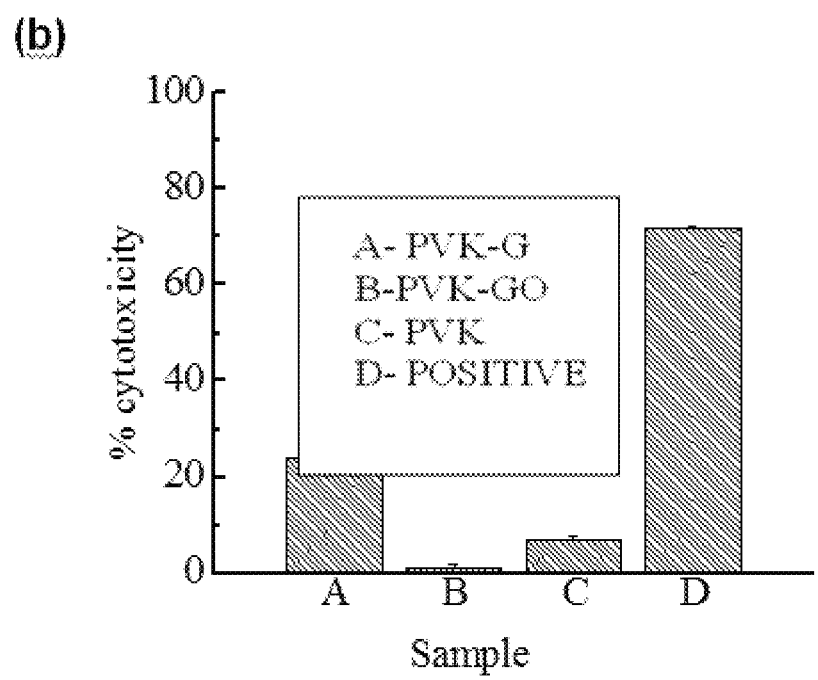
FIG. 7B displays an embodiment of a cytotoxicity measurement of the nanomaterial against NIH-3T3 fibroblasts, wherein the nanomaterial is (b) PVK-containing nanocomposites.

Another preferred embodiment of the present invention discloses the toxic effect of PVK-GO-modified filters and GO modified filters against NIH-3T3 fibroblasts, as illustrated in FIGS. 7A and 7B with (a) pure nanomaterial (graphene and graphene oxide) and (b) PVK-containing nanocomposites solution. An important consideration for the fabrication of a "point-of-use" device such as filters is its biocompatibility to humans. The ability of the nanomaterial to be nontoxic to human cells is therefore tested after exposure to NIH-3T3 fibroblast cells using MTS assay. Results show that for the pure carbon-based nanomaterial (GO and graphene) higher toxicity levels are observed. In contrast, the measured % cytotoxicity of the PVK-containing nanocomposites (PVK-GO, PVK-G) is lower. No cytotoxic effects are observed for the pure PVK solution.

Figure 8:
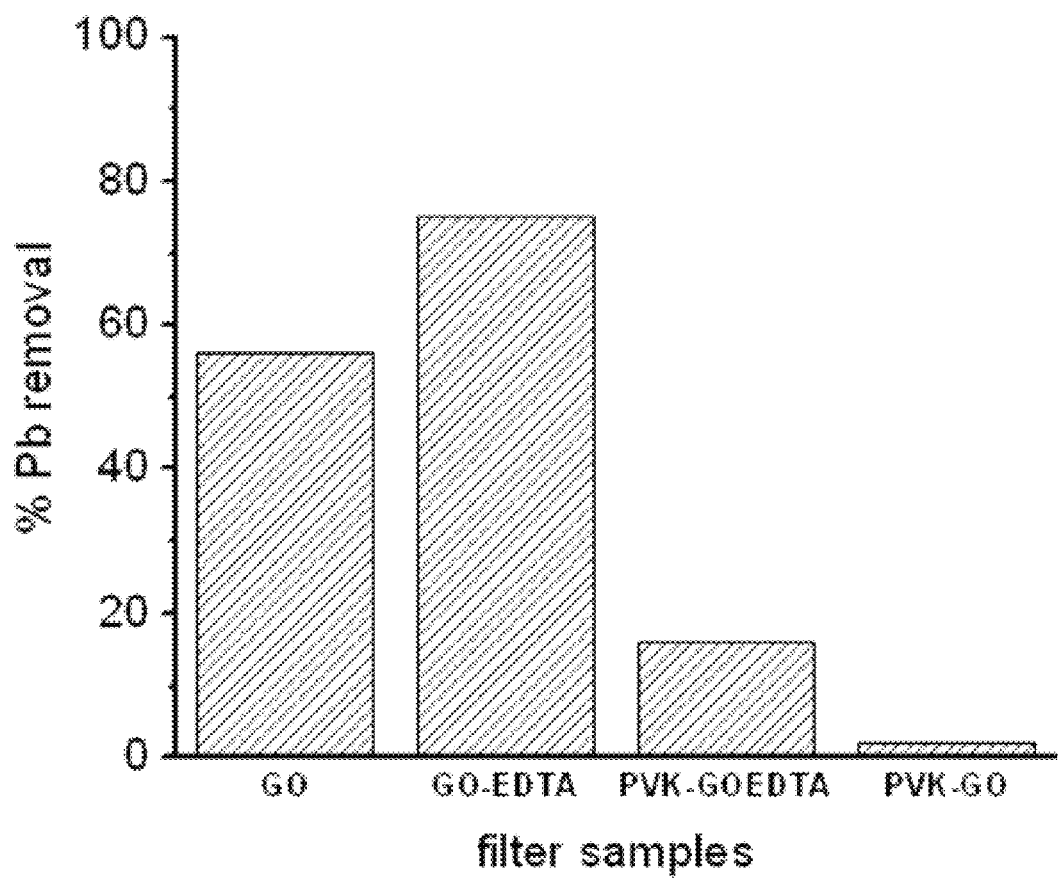
FIG. 8 displays an embodiment of the $Pb^{2+}$ removal efficiency of the nanomaterial-modified filters.
Figure 9A:
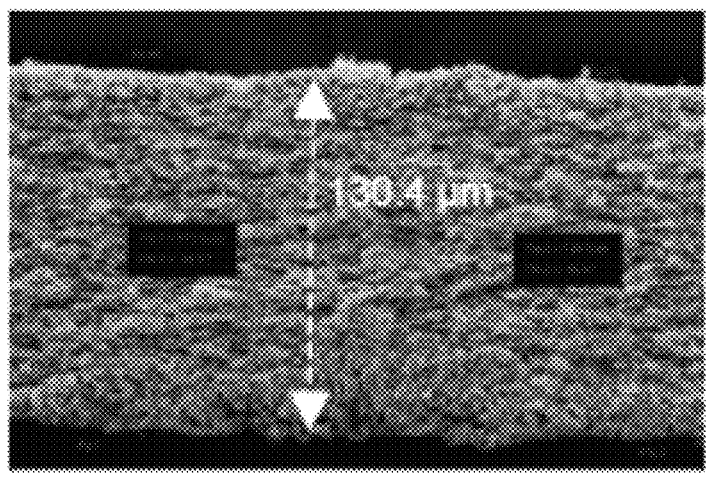
FIG. 9A displays an embodiment of a representative SEM cross-section image of (a) bare nitrocellulose filter.
Figure 9B:
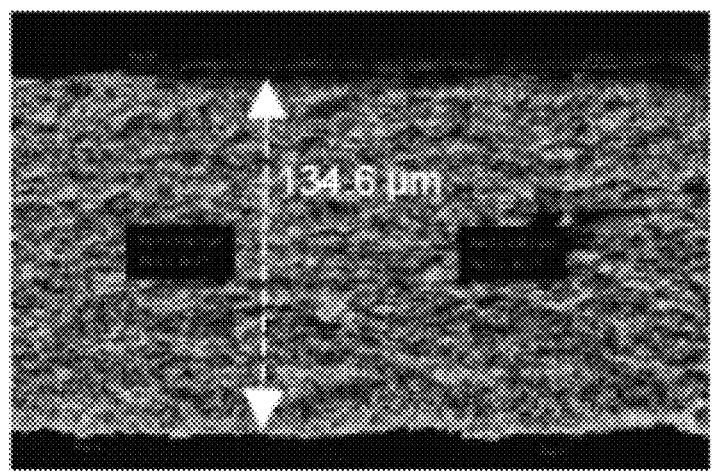
FIG. 9B displays an embodiment of a representative SEM cross-section image of (b) PVK-GO filter.
Figure 9C:
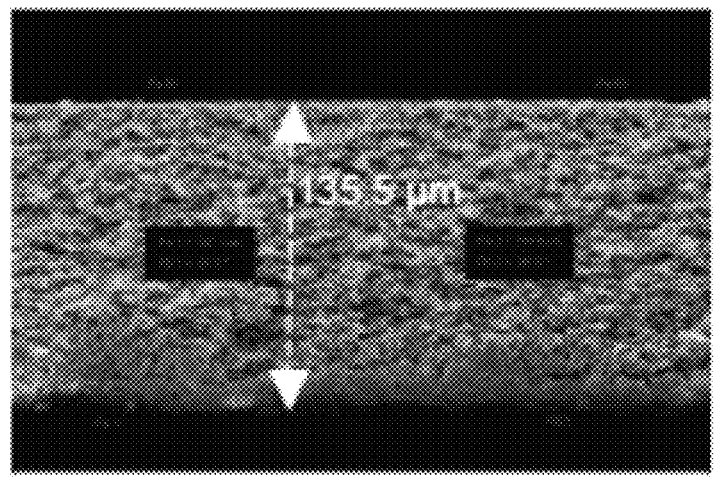
FIG. 9C displays an embodiment of a representative SEM cross-section image of (c) GO-modified filter.

Other embodiments of the present invention disclose the ability of PVK-GO-EDTA modified filters and GO-EDTA modified filters to effectively remove heavy ions such as but not limited to lead ($Pb^{2+}$). Filters coated with PVK-GO, GO-EDTA, PVK-GO-EDTA, or GO filters are tested for their effectiveness to remove $Pb^{2+}$ in solution. FIG. 8 shows that for all the PVK containing nanocomposite-modified filters, a lower percentage of removed $Pb^{2+}$ is observed compared to the removal efficiency of their corresponding pure form (GO, GO-EDTA). A similar process can be used for the removal of other metal ions such as Pb, Cu, As, Zn, and Cr.

Figure 10:
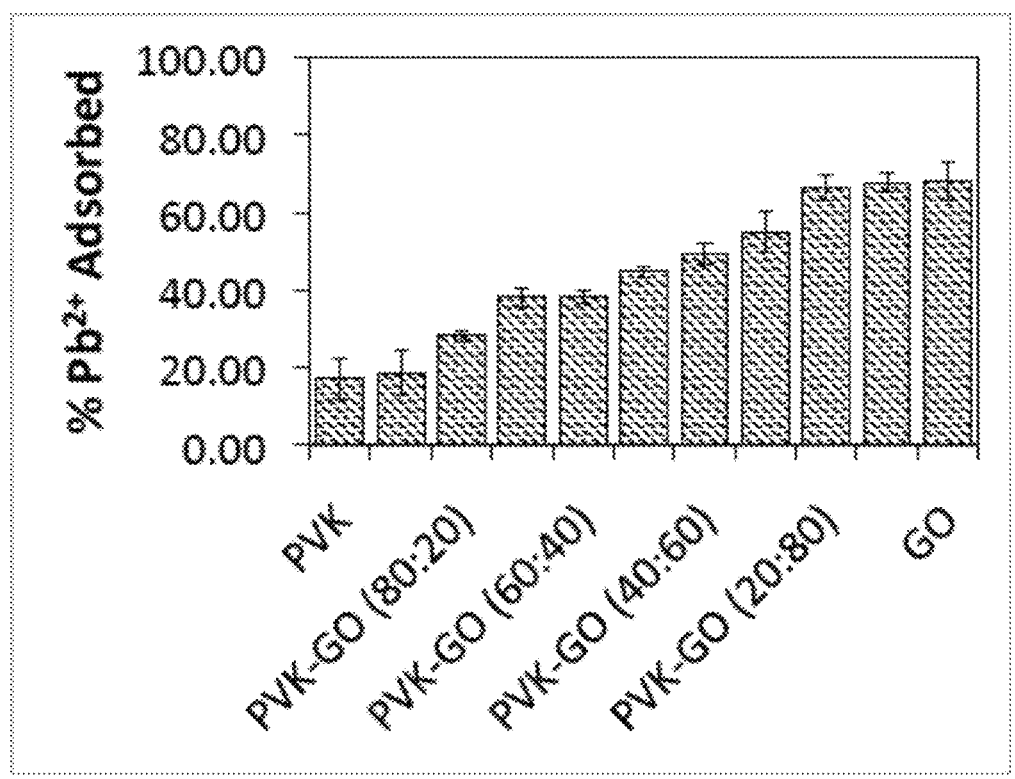
FIG. 10 displays an embodiment of $Pb^{2+}$ adsorbed onto various PVK-GO concentration ratios after exposure to $Pb^{2+}$ (10 ppm) for 2 hrs.
Figure 11:
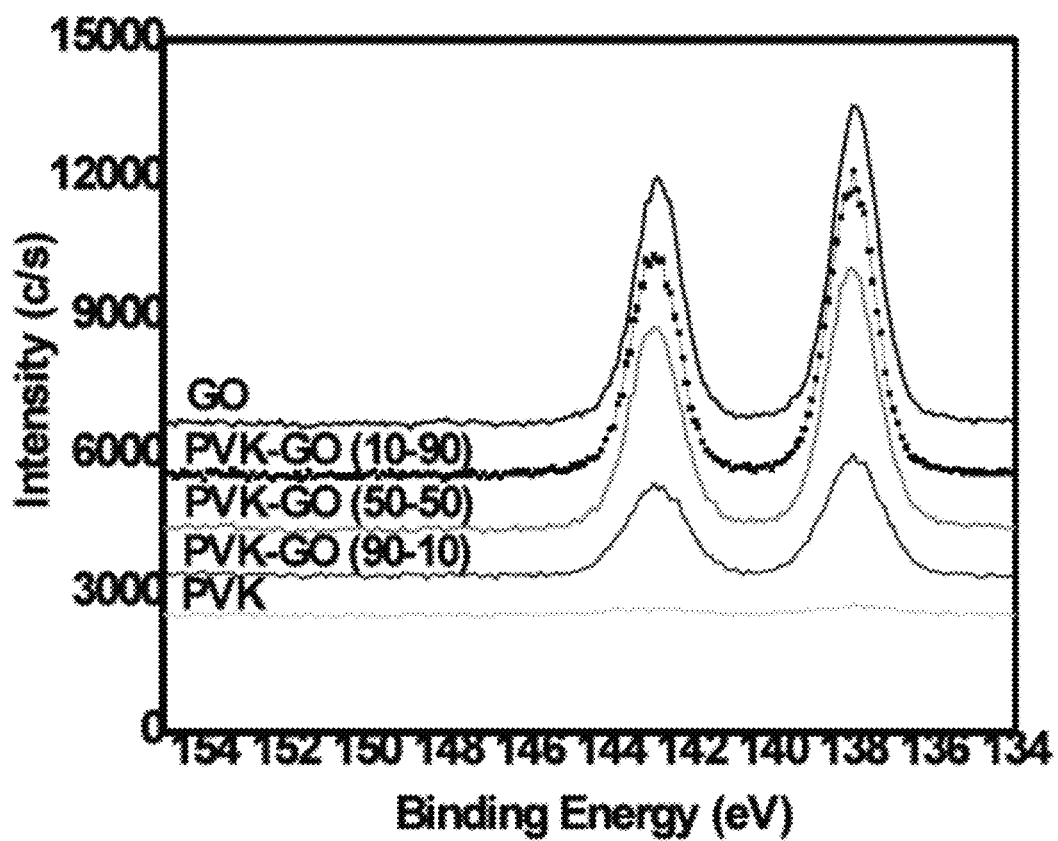
FIG. 11 displays an embodiment of an XPS $Pb^{2+}$ spectra obtained on the surface of nanomaterials after exposure to $Pb^{2+}$ (10 ppm) for 2 h.

The effect of concentration (% weight) ratio of PVK-GO to the removal of Pb (II) in a solution is shown in FIG. 10. It was observed that as the amount of GO in PVK-GO increases, the percentage removal of $Pb^{2+}$ also increases. A similar trend was also observed in the XPS Pb (II) 4f spectra on the surface nanomaterials after exposing them to 10 ppm of lead ($Pb^{2+}$) for 2 hours (see FIG. 11). Apparently, the adsorbent with abundant oxygen-containing functional groups (for example, more amount of GO) shows excellent $Pb^{2+}$ adsorption capacity. This increase in adsorption of $Pb^{2+}$ ion onto PVK-GO nanocomposite maybe attributed to the increase of carboxylic acids, hydroxyl and carbonyl surface groups in GO. The oxidation of graphite can offer not only a more hydrophilic surface structure, but also a larger number of oxygen-containing functional groups such as, —COOH and OH—, thereby making GO and its nanocomposite active for capturing heavy metals in aqueous solution.

Figure 12:
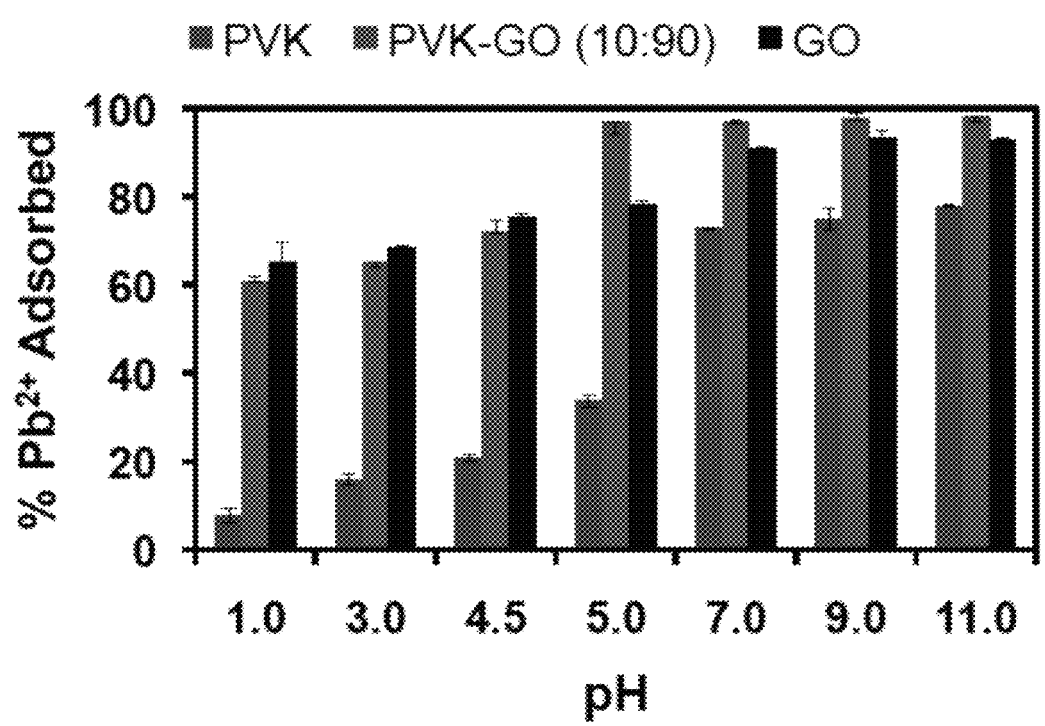
FIG. 12 displays an embodiment of the % $Pb^{2+}$ adsorbed onto nanomaterials at various pH after 2 hours.

The pH of the aqueous solution plays an important role in the adsorption capacity of the PVK-GO nanocomposite adsorbent. Generally, the adsorption capacities of metallic species of most adsorbents increase with the increase in the pH. The effect of pH on the adsorption of $Pb^{2+}$ by the nano adsorbents is illustrated in FIG. 12. In this experiment, PVK, GO, and their nanocomposites behave similarly with most of the adsorbents, wherein the adsorption capacity increases with the increasing pH. It was observed that at pH below 5, the adsorption capacities of nanomaterials are low. In an acidic solution, the species of surface groups of GO and PVK-GO are —COOH and —OH. When pH is lowered there are some competitions on —COO⁻ and —O⁻ sites between proton and metal cation in an acidic condition, resulting in a lower adsorption capacity of nanomaterials. Moreover, the decrease in pH leads to neutralization of surface group charge, and thus the adsorption of cations should also decrease. On the other hand, when the pH is 5 and above, the adsorption is increasing with the increase in pH value. The increase in the pH values of the solution will convert more of the —COOH and —OH to —COO⁻ and —O⁻, respectively, and provide electrostatic interactions that are favorable for adsorbing $Pb^{2+}$ and other cationic species.

In some embodiments it was found out that at high pH value PVK-GO (10:90), as well as PVK and GO, exhibited high lead (II) removal, at a pH value >7, precipitation of the metal solution was observed. This is possibly due to hydrolysis of metal ions to form a metal hydroxide which, in this case, is lead (II) hydroxide. Hence, the high adsorption capacity of adsorbents at a pH above 7 cannot be fully attributed to the presence of the adsorbent, but rather it might be a contribution of the adsorption by nanomaterials and precipitation of metal in a basic aqueous solution.

While high lead (II) adsorption capacity of PVK-GO (10:90) at an optimum pH of around 7 can be attributed mostly to the surface functional group COO— and OH— of GO, the presence of PVK in the nanocomposite has also been shown to enhance the adsorption of lead (II) onto PVK-GO. The incorporation of GO to the carbazole group of PVK may stabilize the dispersion of the nanocomposite, creating more surface area metals adsorption. This can explain why at optimum pH, PVK-GO (10:90) removes 97% $Pb^{2+}$ from aqueous solution which is more than the 90% removal lead (II) removal of pure GO.

Figure 13:
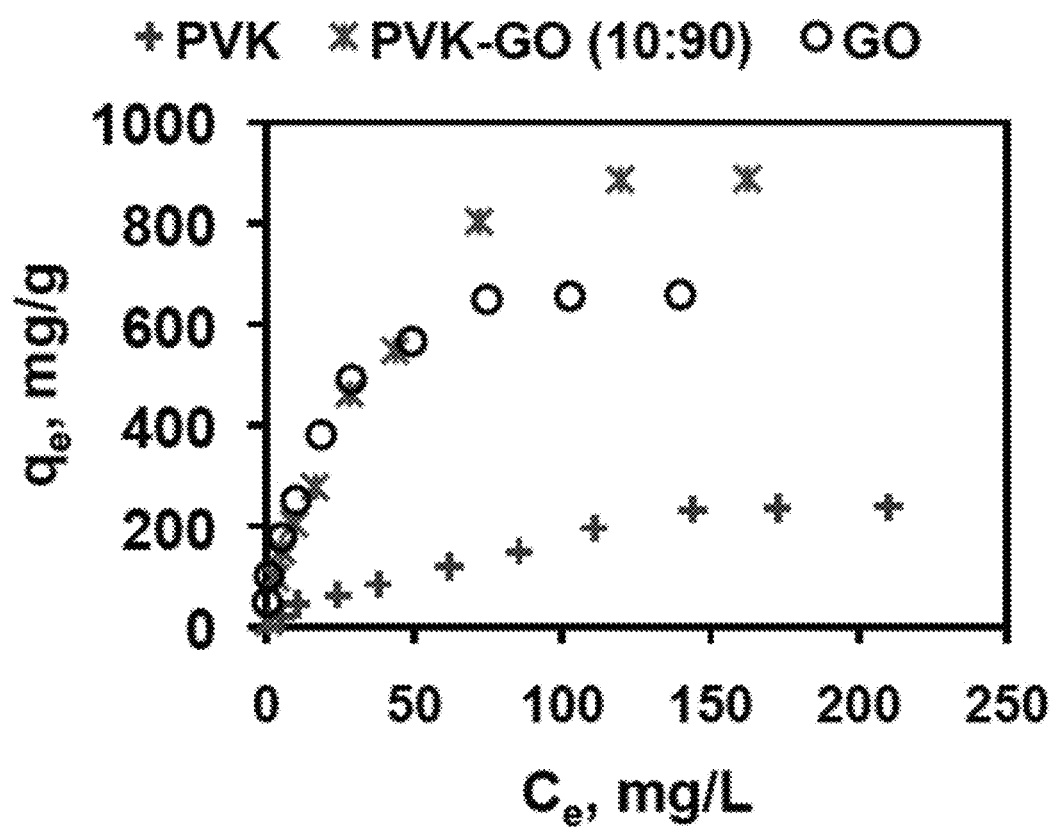
FIG. 13 displays an embodiment of the adsorption isotherms of $Pb^{2+}$ onto adsorbents, wherein the experiment conditions include: Initial concentration 5-300 mg/L, sample dosage 10 mg/100 mL, pH ~7, temperature 25±5° C., and contact time 24 hours.
Figure 14A:
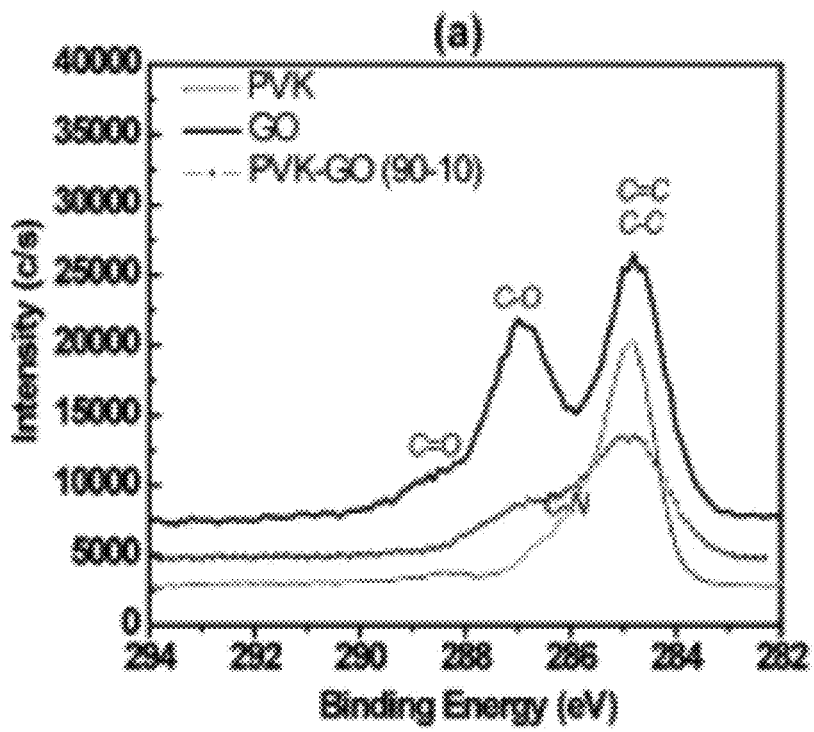
FIG. 14A displays an embodiment of (a) XPS C1S spectra obtained for PVK, GO, and PVK-GO.
Figure 14B:
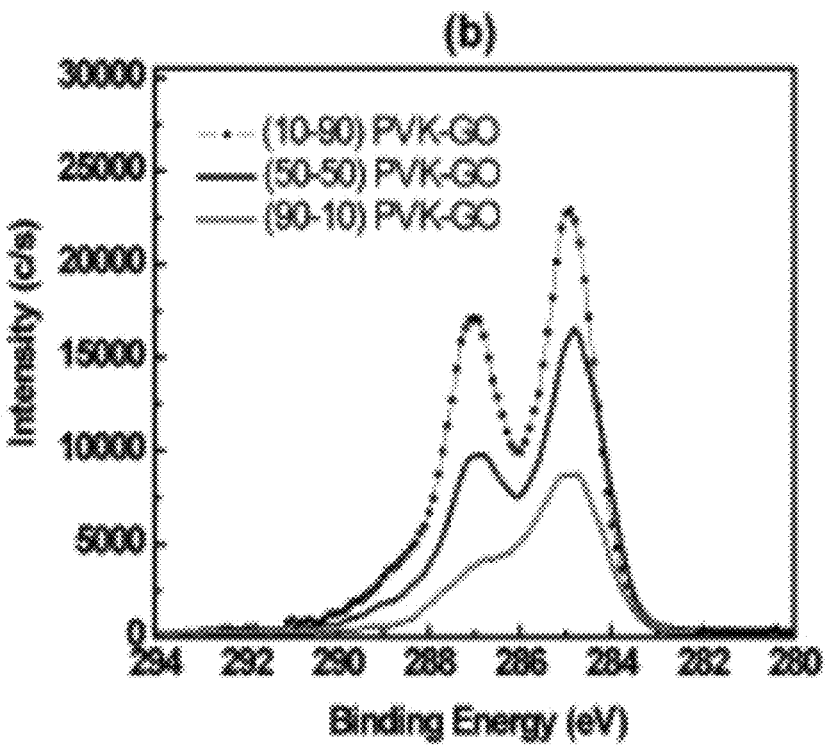
FIG. 14B displays an embodiment of (b) C1s spectra obtained for the PVK-GO at different GO loadings in the nanocomposite.
Figure 15:
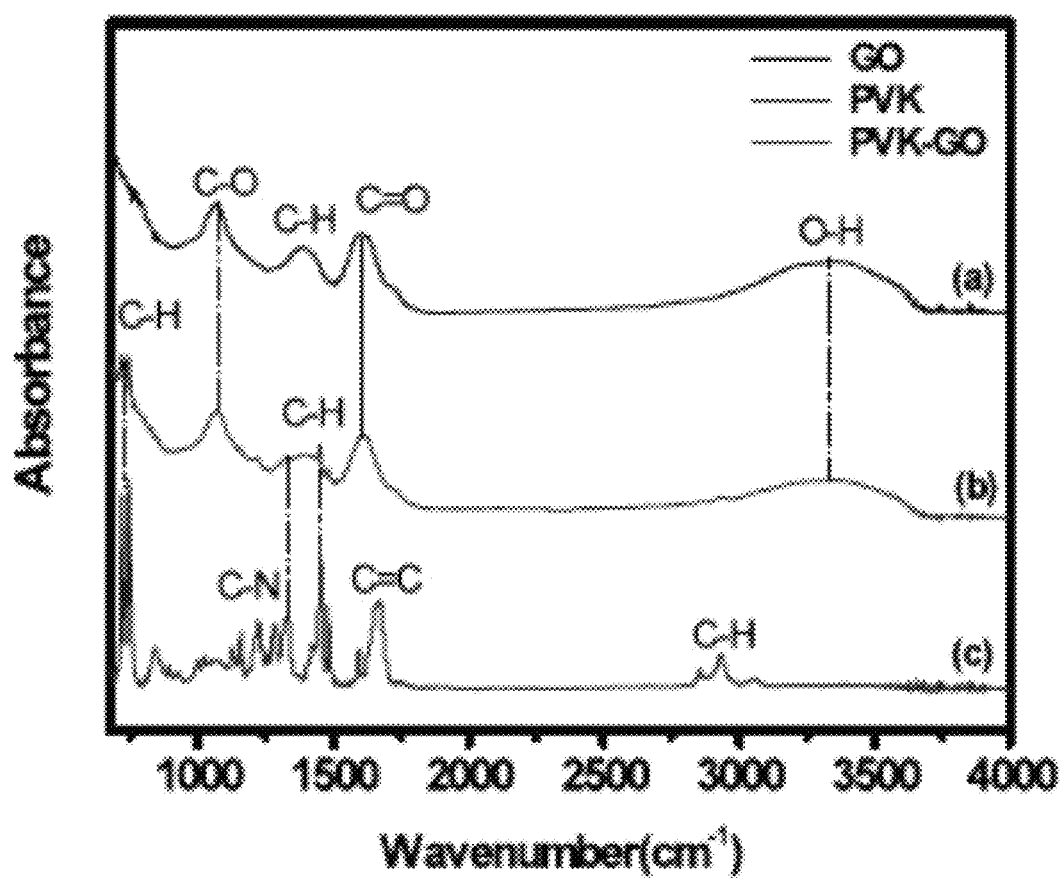
FIG. 15 displays an embodiment of ATR-IR spectra of (a) GO (b) PVK-GO and (c) PVK.
Figure 16:
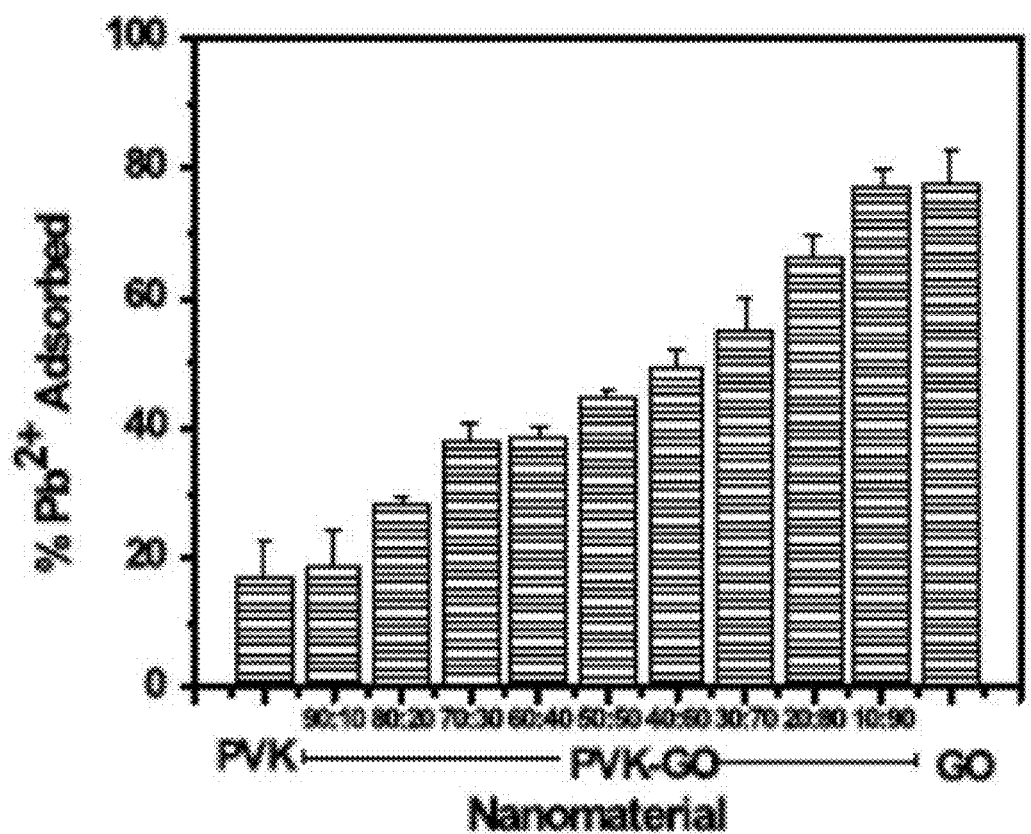
FIG. 16 displays an embodiment of $Pb^{2+}$ adsorbed onto various PVK-GO concentration ratios after exposure to $Pb^{2+}$ (10 ppm), pH=5±0.5 for 2 h.
Figure 17:
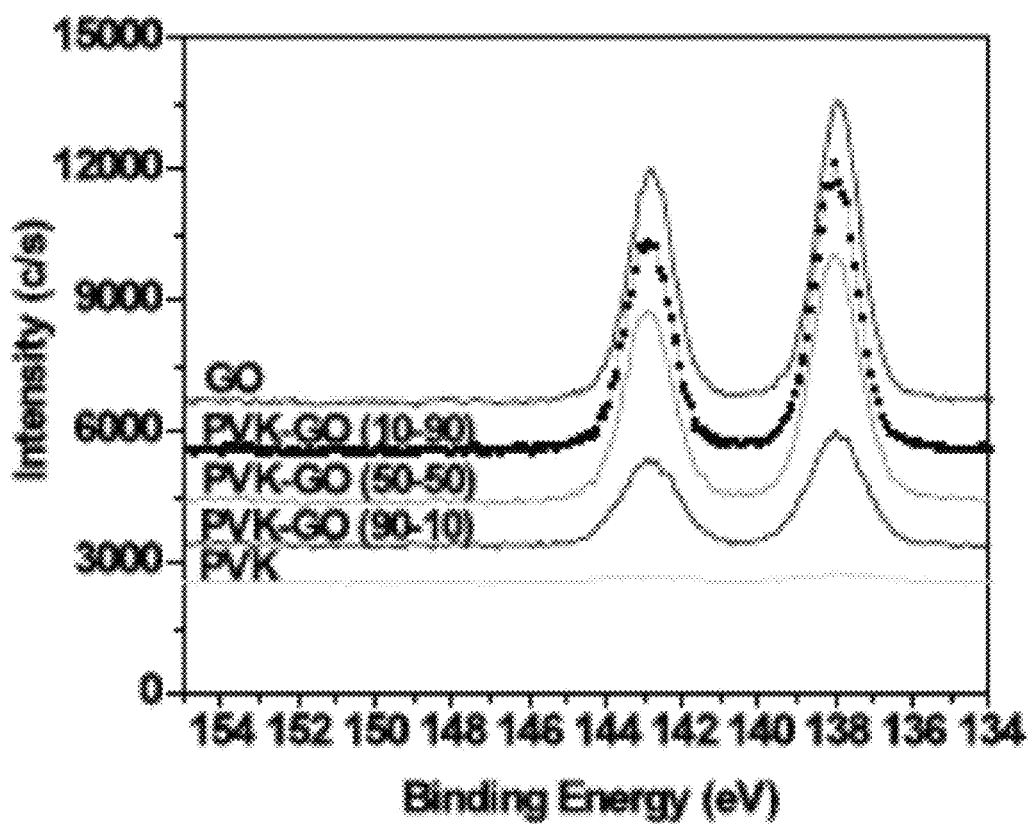
FIG. 17 displays an embodiment of XPS $Pb^{2+}$ spectra on nanomaterials after exposure to $Pb^{2+}$ (10 ppm) for 2 h.

It is important to determine the adsorption capacity of the adsorbent to ascertain the amount of adsorbent required for quantitative enrichment of metal from an aqueous solution. FIG. 13 shows the adsorption of lead (II) with the initial concentration ranging from 5 mg/L to 300 mg/L as the initial concentrations. Lead (II) ions are more favorably adsorbed onto PVK-GO (10:90) and the highest sorption capacity was obtained at 887.98 mg/g at an equilibrium concentration of 162.454 mg/L. On the other hand, the highest sorption capacity attained by PVK and GO were 238.398 mg/g ($C_e$=209.97 mg/L) and 658.83 mg/g ($C_e$=139.849 mg/L), respectively. These results are much higher than those obtained from activated carbon, Graphene Oxide-Ethylenediaminetetraacetic Acid (GO-EDTA), Carbon Nanotube (CNT), and some other carbon-based nanomaterials.

Adsorption experiments were carried out by adding 10 mL of PVK-GO (1 mg/mL) solutions to different concentrations of $Pb^{2+}$ solutions dissolved in 100 mL volumes at 25±5° C. The concentrations of $Pb^{2+}$ solutions varied from 5 ppm to 300 ppm while the pH was maintained at 7±0.5. The mixtures of the nanocomposites with the heavy metal solutions were sealed in a vial and allowed to react for 24 h until the equilibrium state was achieved. After reaching the equilibrium, the mixtures were filtered through 0.22 μm pore size membranes. The lead concentrations in the filtrates were analyzed using atomic absorption spectroscopy (AAS) and were determined as the equilibrium concentration of $Pb^{2+}$ ($C_e$).

The experimental data for the adsorption of lead (II) onto the adsorbents were analyzed using the Langmuir and Freundlich adsorption isotherm model. The Langmuir isotherm is based on the three assumptions, namely: (1) sorption is limited to monolayer coverage; (2) all surface sites areas are alike, and only can accommodate one adsorbed atom; and (3) the ability of a molecule to be adsorbed on a given site is independent of its neighboring sites occupancy. Freundlich model is an empirical equation that is applicable to highly heterogeneous surfaces. The adsorption parameters for Langmuir fit were estimated by the following equation:

$$q_e = \frac{q_{max} K C_e}{1 + K C_e}$$

where $q_e$ is the adsorption amount of lead (II) onto adsorbent (mg/g) at equilibrium, $q_{max}$ is the adsorption capacity of metals on adsorbent (mg/g), $C_e$ is the equilibrium concentration of metals (ppm), and $K_L$ is the Langmuir adsorption constant, which is related to adsorption energy. The Freundlich model is shown in the following equation:

$$q_e = K_f C_e^{1/n}$$

where $q_e$ is the adsorption amount of lead (II) onto adsorbent (mg/g) at equilibrium, $C_e$ is the equilibrium concentration of metals (ppm), and $K_F$ and n are Freundlich constants that are related to adsorption energy and adsorption intensity, respectively.

The following table shows the parameters of Langmuir and Freundlich Model for Adsorption of $Pb^{2+}$ onto PVK, GO and PVK-GO:

TABLE 1

Parameters of Langmuir and Freundlich Model for Adsorption of $Pb^{2+}$ onto PVK, GO and PVK-GO

| Nanomaterials | Langmuir Model | | | Freundlich Model | | |
| --- | --- | --- | --- | --- | --- | --- |
| | $q_{max}$ (mg/g) | $K_L$ (L/mg) | $R^2$ | $K_F$ (mg/g)/(mg/L)$^n$ | N | $R^2$ |
| PVK | 412 | 0.007 | 0.982 | 10.39 | 0.604 | 0.974 |
| GO | 768.1 | 0.057 | 0.987 | 125.51 | 0.360 | 0.950 |
| PVK-GO$_{(10:90)}$ | 1191.2 | 0.022 | 0.988 | 80.28 | 0.495 | 0.955 |

It can be seen from the above table that Langmuir model fits well with the experimental data with the higher correlation coefficient than in Freundlich model. In this study, the maximum adsorption capacities of $Pb^{2+}$ onto PVK, GO and PVK-GO (10:90) are 412, 768.1 and 1191.2 mg/g, respectively. Again, these values are greater than most of the nano adsorbents such as EDTA-GO, CNT and other carbon-based adsorbents for similar studied metal ion ($Pb^{2+}$).

While the results disclosed herein were obtained using modified cellulose nitrate membranes, similar achievements can be reached when the cellulose nitrate membranes are substituted for any of the following: polyvinylidine fluoride (PVDF), nylon, polycarbonate, cellulose, poly-tetrafluoroethylene (PTFE), ceramic filters, glass fiber, and any combination thereof.

While the invention described herein specifically focuses on the fabrication of surfaces and filters modified with poly-N-vinyl carbazole (PVK)-graphene based nanomaterial and related composites having antibacterial and heavy metal removal properties, those experienced in the field would recognize the extension of such approach to other systems.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

EXAMPLES

Example 1

The poly-N-vinyl carbazole (PVK) and graphite (−10 mesh, 99.9% metal basis) were purchased from Sigma Aldrich (USA) and Alfa Aesar, respectively. $H_2SO_4$, $KMnO_4$ and HCl were obtained from Fisher Scientific. $NaNO_3$ and NaOH were obtained respectively from Merck KGaA and Across. $H_2O_2$ was purchased from MACRON. All chemical reagents used were of analytical grade and used without further purification. All aqueous solutions were prepared using dionized (DI) water or Millipore water.

The PVK solution was prepared by dissolving 5 mg PVK powder in 1 mL CHP (1-cyclohexyl-2-pyrrolidone) solution. The solution was ultrasonicated for 6 hours and suspended in 5 mL Millipore water.

GO was prepared using the modified Hummers' method (Hummers and Offeman, 1958). Briefly, 3 g of graphite flakes was mixed with 3 g of $NaNO_3$ by stirring, and then 138 mL of $H_2SO_4$ was added. The reaction was done in an ice bath for 30 min. After that, the mixture was further oxidized by adding 18 g of $KMnO_4$ and stirred for another 30 min under the same condition. The temperature was then raised and maintained at 35±5° C. for 24 h to allow complete oxidation of the graphite. A volume of 240 mL of water was added and the mixture was continuously stirred for 30 min while the temperature was increased and maintained at 90±5° C. The solution was further diluted by adding 600 mL water and stirred for 10 min at 90±5° C. After that, 18 mL of $H_2O_2$ was added and then the solution was cooled down to room temperature. The product was centrifuged at 10,000 rpm for 10 minutes and the pellet was collected. The solids were washed with base (1.0 M NaOH) and acid (1.0 M HCl) for 30 min each. Subsequent washings with water were done to neutralize the pH of the final product. The residue was finally washed with methanol, sonicated for 1 h, and dried in a vacuum oven.

The PVK-GO nanocomposite solution was prepared by a mixing process. The GO solution was prepared by dispersing 20 mg of GO powder in 20 mL of DI water to make 1 mg/mL solution followed by sonication for 30 min. The PVK solution (1 mg/mL) was prepared by dissolving 5 mg of PVK powder in 1 mL 1-cyclohexyl-2-pyrrolidone (CHP) solution and the PVK solution was ultrasonicated for 6 h, then suspended in 4 mL DI water. Next, the PVK solution was slowly mixed into the GO solution at the desired concentration ratio and then the mixture was ultrasonicated for another 30 min prior to use.

There were two methods used to prepare the filters: (1) gravity and (2) dip coating method.

Gravity method: In this method, the PVK-GO and GO modified-filters were made by filtration of the suspension (PVK, PVK-GO and GO, 1 mg/ml) through a nitrocellulose or PVDF filter membrane (47 mm in diameter, 0.2-5 μm pore size) via vacuum at room temperature. The thickness of the filter was controlled by adjusting the volume of the colloidal suspension.

Dip coating method: Nitrocellulose filter membranes (0.2-0.45 μm, 47 mm in diameter Milipore USA) were used as base filter membranes and were dip coated with previously prepared PVK (1 mg/ml), GO (1 mg/ml) and PVK-GO (1 mg/ml) suspension in water. Briefly, each filter membrane was placed in a small Petri dish and 5 ml of the sample suspension was poured into the Petri dish so that the filter membrane was completely submerged under suspension. After 30 minutes of impregnation, the filter membranes were removed carefully and dried overnight in vacuum oven. Bare Nitrocellulose membranes were used as Controls.

A newly synthesized nanocomposite needs to be characterized in order to verify its successful preparation. In the present study, the surface of PVK-GO nanocomposite was synthesized and characterized with XPS and ATR-IR and compared the spectra to pure GO and PVK. The results show that pure GO has the C1s spectra peaks positioned at binding energies ~284.7 eV (assigned to C—C and C═C), ~287.1 eV (assigned to C—O) and a short peak on ~288.1 eV (assigned to C═O) (Dreyer et al., 2010). Similarly, PVK C1s spectra present a peak at ~284.7 eV (corresponding to C—C and C═C) but with much lower intensity than pure GO. A distinguishing short peak for PVK was also detected at ~286.4 eV (corresponding to C—N). These results were similar to previously published work, which shows successful in synthesis of the nanocomposite.

In the PVK-GO nanocomposites, the addition of GO to PVK to form PVK-GO leads to the reduction of the intensity of the peaks in the C1s spectra that corresponds to C—C and C═C peaks when compared to the spectra of pure GO and PVK. The confirmation that GO was successfully incorporated in the nanocomposite was demonstrated by the presence of C—O, which is one of the main signature peaks for the presence of GO in the nanocomposite. This peak was visible in all PVK:GO nanocomposites. Furthermore, the C═O bond peak was very small in PVK-GO XPS C1s spectra, especially in the PVK:GO containing only 10% wt. This can be explained by the fact that the peak intensities for these bonds increases relatively to GO concentration, which allows the estimation of the actual percentage of GO in PVK-GO nanocomposite through XPS measurement. The lower the concentration of the GO in the polymer nanocomposite, the lower this peak will be.

The presence of the PVK in the nanocomposite was determined by the short peak situated at ~285.4 eV, which corresponds to C—N bond. Based on the results obtained from the XPS measurements of the nanocomposites, the actual amounts of GO in the PVK-GO nanocomposites synthesized were approximately close to the estimated amounts. These results established successful synthesis of nanocomposites with different concentrations of GO in PVK-GO nanocomposite.

TABLE 2

Estimated GO concentration in PVK-GO nanocomposite

| Sample (wt %) | % GO in nanocomposite |
|---|---|
| PVK-GO (10-90) | ~93 |
| PVK-GO (50-50) | ~54 |
| PVK-GO (90-10) | ~15 |

In addition to the XPS measurements, the functional groups present in PVK-GO were also confirmed using ATR-IR spectroscopy. The characteristic absorption bands of PVK were the following: 3100 $cm^{-1}$ (aromatic C—H stretch), 2930 $cm^{-1}$ (aliphatic C—H stretch from the polymer backbone), and 1670 $cm^{-1}$ (C═C stretch), 1450 $cm^{-1}$ (aliphatic C—H bend), 1330 $cm^{-1}$ (C—N stretch from vinylcarbazole), and 745 $cm^{-1}$ (aromatic C—H bend). These absorption peaks were also observed in PVK-GO with additional peaks located at 3376 $cm^{-1}$ (broad O—H stretching of carboxylic acid/hydroxyl group), 1620 $cm^{-1}$ (C═O carbonyl stretching of carboxylic acid) and 1060 $cm^{-1}$ (C—O carbonyl stretching of carboxylic acid). These additional distinctive peaks can be attributed to the high amount of GO (in the nanocomposite. This indicates the successful formation of the PVK-GO nanocomposite.

The selectivity and sorption capability of adsorbents are directly related to the surface properties and functional groups on the adsorbents. In order to understand the nanocomposite functional groups that can affect the removal of metal ions in aqueous solutions, the PVK-GO nanocomposite was characterized before and after exposure to $Pb^{2+}$ with ATR-IR. The results show that the intensity of the absorbance spectra of GO and PVK-GO at 1280 $cm^{-1}$ (C—O carbonyl stretching of carboxylic acid), 1650 $cm^{-1}$ (C═O carbonyl stretching of carboxylic acid) and 3200 $cm^{-1}$ (broad O—H stretching of carboxylic acid/hydroxyl group)

have decreased after exposure to $Pb^{2+}$ solution for 2 h, indicating that these functional groups in the nanocomposite are responsible for the removal of heavy metal.

The results show that the adsorbent with the most abundant oxygen-containing functional groups, i.e. GO, shows the best $Pb^{2+}$ adsorption capacity. Similar results have been observed in previous studies of polymers with these functional groups which corroborates our findings. Therefore, the oxidation of graphite can offer not only a more hydrophilic surface structure, but specifically a larger number of oxygen-containing functional groups such as, —COOH and —OH, thereby making GO and its nanocomposite active for capturing heavy metals in aqueous solution.

Figure 18:
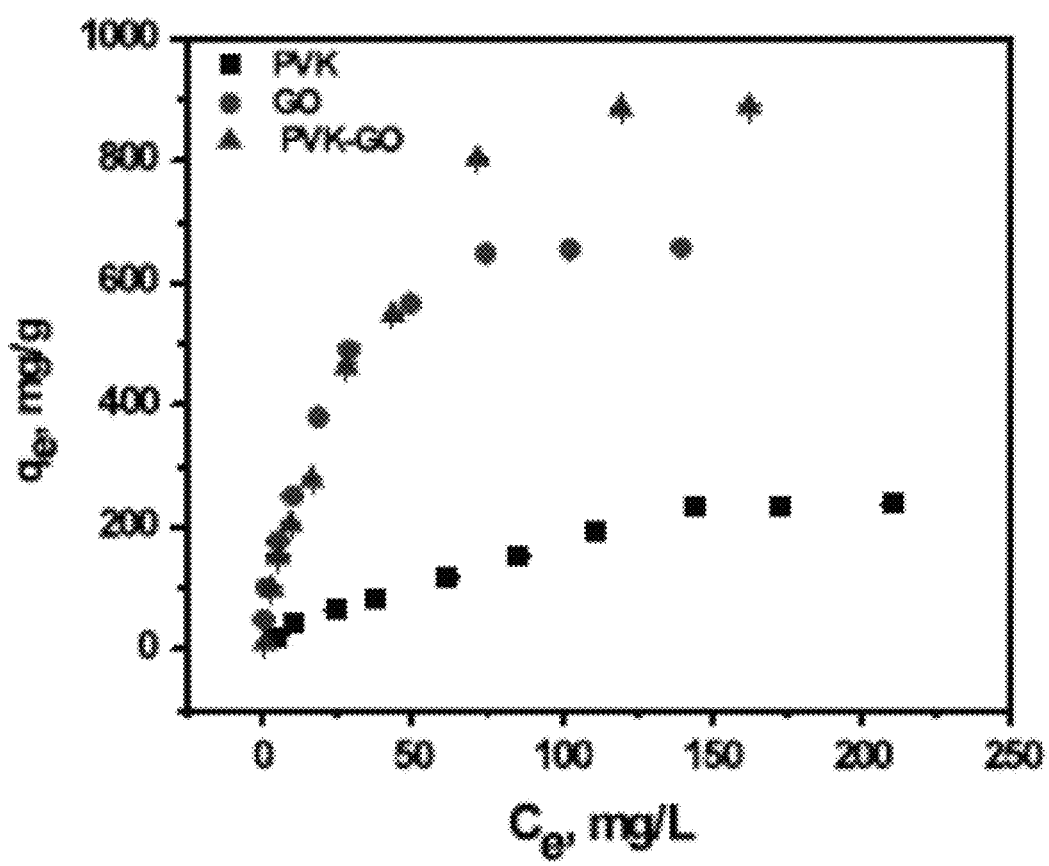
FIG. 18 displays an embodiment of an adsorption isotherm of $Pb^{2+}$ with different nanomaterials, wherein the experimental conditions include: initial $Pb^{2+}$ concentration 5-300 mg/L, sample dosage 0.10 mg/L, pH 7 0.5, temperature 25±5, and contact time 24 h [Note: PVK-GO ratio (10:90)].

Since the nanocomposite PVK-GO containing 90:10 wt % of PVK-GO has been shown to be the most effective in removing heavy metals, it is important to determine the adsorption capacity of the adsorbent to ascertain the amount of adsorbent required to efficiently remove heavy metals, such as lead, from an aqueous solution. FIG. 18 shows the adsorption isotherm of $Pb^{2+}$ with concentrations ranging from 5 mg/L to 300 mg/L. The highest adsorption capacity of $Pb^{2+}$ ions by PVK-GO (10:90) was 887.98 mg/g at an equilibrium concentration of 162.454 mg/L. On the other hand, the highest sorption capacity attained by PVK and GO were 238.398 mg/g ($C_e$=209.97 mg/L) and 658.83 mg/g ($C_e$=139.849 mg/L), respectively. The maximum adsorption capacities of $Pb^{2+}$ onto PVK, GO and PVK-GO (10:90) were 412, 768.1 and 1191.2 mg/g, respectively. These results for PVK-GO are much higher than those obtained from activated carbon fibers (52.7 mg/g), graphene oxide-ethylenediaminetetraacetic acid (GO-EDTA) (479±46 mg/g), carbon nanotubes (15.6 mg/g), multiwalled carbon nanotubes (3.0 mg/g) and some other carbon-based nanomaterials, which suggests that this new nanocomposite is more efficient in the removal of heavy metal than these other materials.

The experimental data for the adsorption of $Pb^{2+}$ onto the adsorbents were further analyzed using the Langmuir and Freundlich adsorption isotherm models. The Langmuir isotherm is based on three assumptions, namely (1) sorption is limited to a monolayer coverage (2) all surface sites are alike, and can only accommodate one adsorbed atom, and (3) the ability of a molecule to be adsorbed on a given site is independent of its neighbouring sites occupancy. Freundlich model is an empirical equation that is applicable to highly heterogeneous surfaces.

TABLE 3

Parameters of Langmuir and Freundlich Model for Adsorption of $Pb^{2+}$ onto PVK, GO and PVK-GO

| Nanomaterials | Langmuir Model | | | Freundlich Model | | |
| --- | --- | --- | --- | --- | --- | --- |
| | $q_{max}$ (mg/g) | $K_L$ (L/mg) | $R^2$ | $K_F$ $(mg/g)/(mg/L)^n$ | N | $R^2$ |
| PVK | 412 | 0.007 | 0.982 | 10.39 | 0.604 | 0.974 |
| GO | 768.1 | 0.057 | 0.987 | 125.51 | 0.360 | 0.950 |
| PVK-GO$_{(10:90)}$ | 1191.2 | 0.022 | 0.988 | 80.28 | 0.495 | 0.955 |

The results from the Langmuir and Freundlich models (Table 3), shows that both the Langmuir and Freundlich models fit well with the experimental data with a high correlation coefficient ($R^2$>0.95). However, the Langmuir model seems to be slightly better than the Freundlich since it has a higher correlation ($R^2$>0.98). Furthermore, in some cases, the adsorption equilibrium data exhibited an asymptotic behavior that can be only presented by the Langmuir isotherm.

Figure 19:
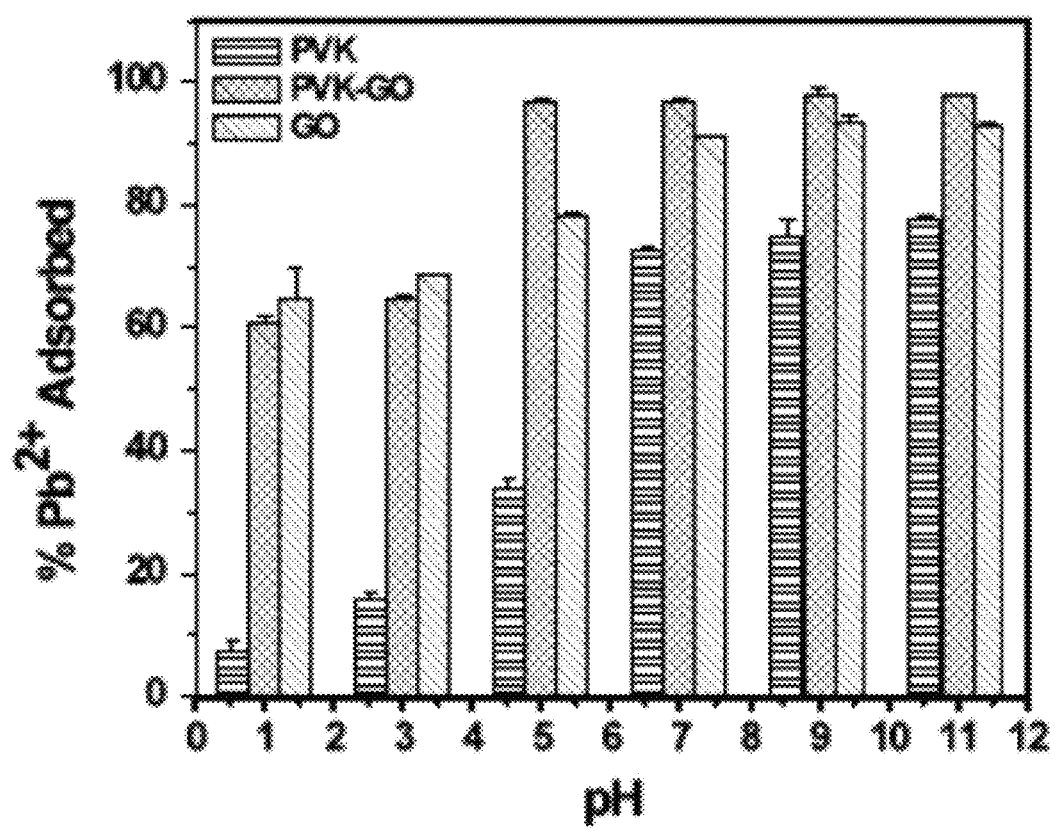
FIG. 19 displays an embodiment of the percent $Pb^{2+}$ adsorbed onto nanomaterials at various pH, sample dose 1 mg/10 mL, T 25±5° C. time 24 h [Note: PVK-GO ratio (10:90)].

The pH of the aqueous solution plays an important role in the adsorption capacity of the PVK-GO nanocomposite adsorbent. Generally, the adsorption capacities of metallic species of most adsorbents increase with an increase in pH. The effect of pH on the adsorption of $Pb^{2+}$ by the nanoadsorbents is presented in FIG. 19. In this experimental embodiment, PVK, GO and their nanocomposite behave similarly to most of the adsorbents, wherein the adsorption capacity increases with increasing pH. It was observed that at pH below 5, the heavy metal adsorption capacities of nanomaterials are lower than more basic pHs. In an acidic solution, the functional groups —COOH and —OH on the surface of GO and PVK-GO are deprotonated. When the pH is acidic there are some competitions for the —COO$^-$ and —O$^-$ sites between protons and metal cations, resulting in a lower adsorption capacity of nanomaterials Moreover, the decrease in pH leads to neutralization of functional groups surface charge, and thus the adsorption of cations also decreases. On the other hand, when the pH is between 5 and 7, the adsorption of $Pb^{2+}$ by PVK-GO increase. At this pH range (5-7) the GO functional groups will convert from —COOH and —OH to —COO$^-$ and —O$^-$, respectively, and provide electrostatic interactions that are favorable for adsorbing $Pb^{2+}$ and other cationic species.

It was found that at high pH values, PVK-GO as well as PVK and GO, exhibited high lead (II) removal. Furthermore, some precipitation of the metal solution was also observed. This is due to hydrolysis of metal ions to form a metal hydroxide which in this case, is lead (II) hydroxide. Hence, the removal of lead at pH above 7 cannot be fully attributed to the presence of the adsorbent only, but also to the precipitation of the heavy metal.

While high $Pb^{2+}$ adsorption capacity of PVK-GO at optimum pH 7±0.5 can be attributed mostly to the surface functional group —COOH and —OH of GO, the presence of PVK in the nanocomposite has also enhanced the adsorption of $Pb^{2+}$ onto PVK-GO. The incorporation of GO to the carbazole group of PVK stabilizes the dispersion of the nanocomposite thus creating a better surface contact area for metal adsorption. This explains why at optimum pH, PVK-GO (10:90) removes 97% $Pb^{2+}$ from aqueous solution which is more than the 90% $Pb^{2+}$ removal of pure GO.

Figure 20:
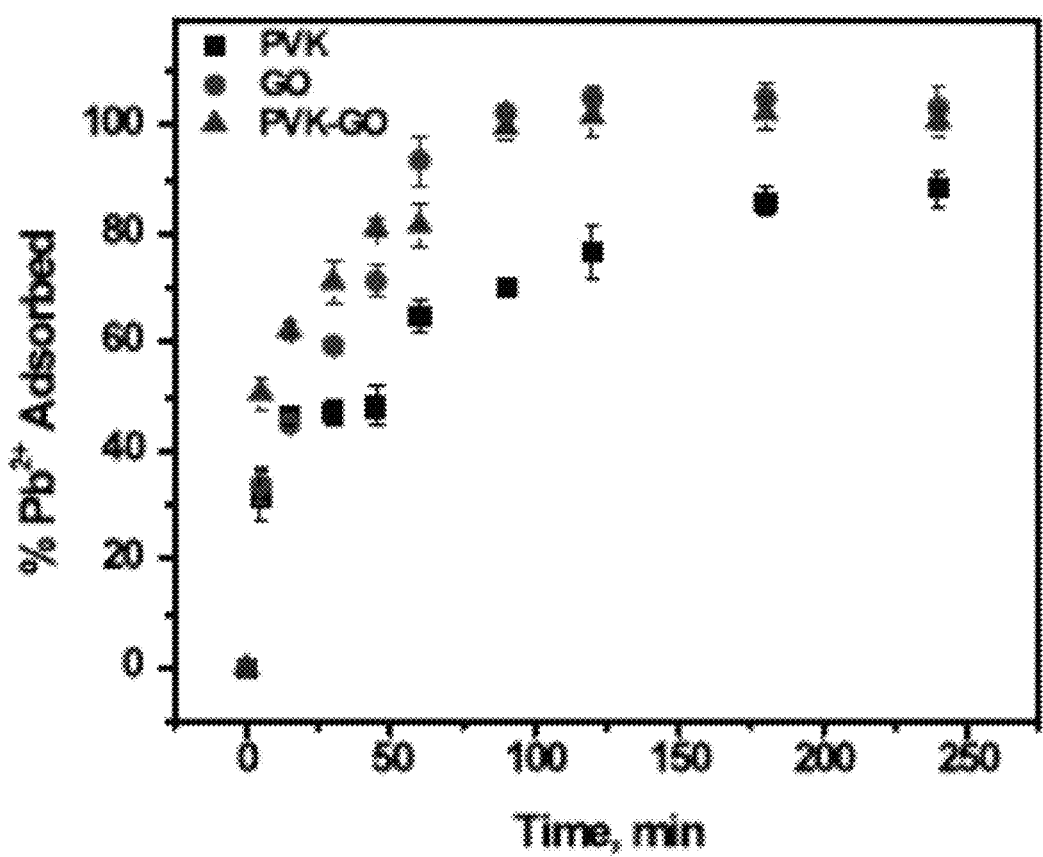
FIG. 20 displays an embodiment of the effect of contact time on the adsorption of $Pb^{2+}$ (10 ppm) onto nanoadsorbent (1 mg/mL) 25±5° C. at pH of 7±0.5.
Figure 21:
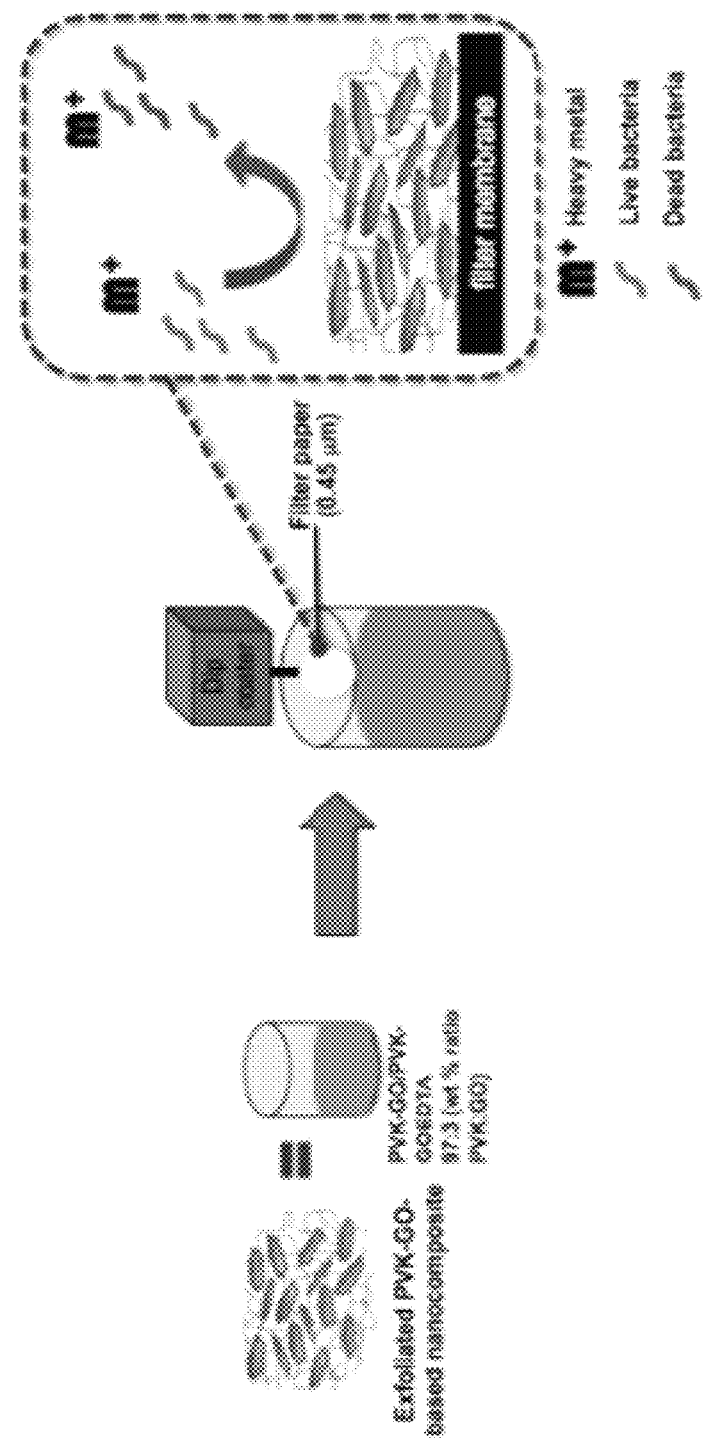
FIG. 21 displays an embodiment of the scheme for fabrication of PVK-GO/PVK-GO-EDTA/PVK-G nanocomposite and GO-EDTA nanomaterial modified membrane filters for antibacterial and heavy metal removal. G=graphene, GO=graphene oxide, PVK=polyvinyl-N-carbazole, EDTA=ethylenediamine tetraacetic acid.

The effect of contact time in the adsorption capacity of $Pb^{2+}$ by PVK-GO, GO, and PVK was tested and the results are presented in FIG. 20. The $Pb^{2+}$ solution was allowed to react with the adsorbents for 5 to 240 min at 25±5° C. and at a pH value of 7±0.5. The results show that the adsorption equilibrium state was achieved in about 90 min of contact time for both GO and PVK-GO. For PVK, on the other hand, no adsorption equilibrium state was observed under these conditions, which suggests that PVK might need longer contact time or does not react with the lead optimally at this pH and temperature.

The short contact time required to reach adsorption equilibrium by PVK-GO and GO indicates that adsorption of $Pb^{2+}$ can be achieved rapidly by these adsorbents. This result is comparable with EDTA-GO, which also presents a very short contact time (10 to 30 min) to achieve adsorption equilibrium. Furthermore, these results are much shorter than other adsorbents such as activated carbon (about 4 h) and multi-walled carbon nanotubes (8 h). This short equilibrium adsorption rate for PVK-GO (10:90) and GO makes these adsorbents attractive for heavy metal removal from water and wastewater.

While the invention has been described with respect to a limited number of embodiments, the specific features of one embodiment should not be attributed to other embodiments of the invention. No single embodiment is representative of all aspects of the inventions. Moreover, variations and modifications therefrom exist. For example, the invention described herein may comprise other components. Various additives may also be used to further enhance one or more properties. In some embodiments, the inventions are substantially free of any additive not specifically enumerated herein. Some embodiments of the invention described herein consist of or consist essentially of the enumerated components. In addition, some embodiments of the methods described herein consist of or consist essentially of the enumerated steps. The appended claims intend to cover all such variations and modifications as falling within the scope of the invention.

The invention claimed is:

1. A filtration membrane comprising:
a filter membrane; and
a nanocomposite deposited on a surface of the filter membrane, wherein the nanocomposite comprises a polymer and a carbon-based nanomaterial, and wherein the nanocomposite is polyvinyl-N-carbazole-graphene, polyvinyl-N-carbazole-graphene oxide, or polyvinyl-N-carbazole-graphene oxide modified with EDTA.

2. The filtration membrane of claim 1, wherein said polymer is present in an amount ranging from 1 to 10 weight percent of said nanocomposite.

3. The filtration membrane of claim 1, wherein said carbon-based nanomaterial is present in an amount ranging from 90 to 99 weight percent of said nanocomposite.

4. The filtration membrane of claim 1, wherein said nanocomposite is deposited on a surface of said filter membrane by gravity coating or dip-coating.

5. The filtration membrane of claim 1, wherein said nanocomposite is homogeneously deposited on a surface of the filter membrane.

6. The filtration membrane of claim 1, wherein said filter membrane is comprised of cellulose nitrate, polyvinylidine fluoride, nylon, polycarbonate, cellulose, poly-tetrafluoroethylene, ceramic, glass, or combinations thereof.

* * * * *